(12) United States Patent
Fai

(10) Patent No.: US 8,490,002 B2
(45) Date of Patent: Jul. 16, 2013

(54) PROJECTED DISPLAY SHARED WORKSPACES

(75) Inventor: Anthony Y S Fai, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 170 days.

(21) Appl. No.: 12/704,344

(22) Filed: Feb. 11, 2010

(65) Prior Publication Data

US 2011/0197147 A1 Aug. 11, 2011

(51) Int. Cl.
*G06F 3/14* (2006.01)
*G06F 3/17* (2006.01)

(52) U.S. Cl.
USPC ........... 715/753; 715/863; 367/127; 382/305; 52/36.1; 345/173; 345/419

(58) Field of Classification Search
USPC .......... 715/200–277, 700–867; 700/701–866; 709/201–229; 705/50–79; 345/30–111, 173, 345/419; 348/206–231.9; 707/200–206; 52/36.1; 367/127; 382/305
See application file for complete search history.

(56) References Cited

U.S. PATENT DOCUMENTS

| | | | |
|---|---|---|---|
| 6,219,057 B1 | 4/2001 | Carey et al. | |
| 6,690,618 B2 * | 2/2004 | Tomasi et al. | 367/127 |
| 6,760,999 B2 * | 7/2004 | Branc et al. | 52/36.1 |
| 7,092,002 B2 | 8/2006 | Ferren et al. | |
| 7,672,543 B2 * | 3/2010 | Hull et al. | 382/305 |
| 2008/0316348 A1 | 12/2008 | Hallock | |
| 2009/0115721 A1 | 5/2009 | Aull et al. | |
| 2009/0168027 A1 | 7/2009 | Dunn et al. | |
| 2009/0219253 A1 * | 9/2009 | Izadi et al. | 345/173 |
| 2010/0315413 A1 * | 12/2010 | Izadi et al. | 345/419 |
| 2011/0083111 A1 * | 4/2011 | Forutanpour et al. | 715/863 |

* cited by examiner

*Primary Examiner* — Ruay Ho
(74) *Attorney, Agent, or Firm* — Fletcher Yoder PC

(57) ABSTRACT

Systems, methods, and devices are provided for creating a shared workspace where images may be shared between projected displays. In one embodiment, electronic devices each may include a projector that produces a projected display and a camera that detects gestures made with respect to the projected displays. The electronic devices may interpret gestures on the projected displays to identify image sharing commands for sharing images between the projected displays. The electronic devices may be connected through a communication link that allows the electronic devices to share image data for producing images on any of the projected displays included within the shared workspace.

37 Claims, 10 Drawing Sheets

PROJECTED DISPLAY SHARED WORKSPACES

BACKGROUND

The present disclosure relates generally to electronic devices, and, more particularly to electronic devices with projected displays that may be in communication with one another to form a shared workspace.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Consumers frequently store many types of data on electronic devices, such as cellular telephones, portable media players, laptop computers, and personal data assistants. For example, consumers may store photographs, movies, presentations, messages, documents, databases, and spreadsheets on electronic devices. Due to the increasing portability of electronic devices, consumers frequently share data stored on electronic devices with other people. Many electronic devices include display screens that allow a consumer to display the data and allow viewing of the data by other people. However, to facilitate portability, these display screens may be small, which may inhibit viewing by larger groups of people. Further, to facilitate viewing on the display screen, the electronic device may be transferred between viewers, which may be inconvenient.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to electronic devices that may be connected to one another over one or more communication links to produce a shared projected workspace. In accordance with certain embodiments, each electronic device may include a projector that may be used to produce a projected display. Two or more projected displays, each from a separate electronic device, may be displayed proximate or adjacent to one another to produce the shared projected workspace. Images displayed on one of the projected displays within the shared workspace may be transferred and/or copied to another projected display within the shared workspace. According to certain embodiments, the electronic devices may include a graphical user interface (GUI) for transferring images between the projected displays. The electronic devices each also may include a camera that detects user gestures on the projected display. In these embodiments, a user may perform a gesture to transfer images between the projected displays.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to electronic devices and systems that may be employed to create a shared workspace. The shared workspace may include two or more projected displays, each generated by a separate electronic device. Images may be transferred between the projected displays within the shared workspace. For example, the electronic devices may communicate with each other over a communication link that allows data for images to be transferred between the electronic devices for display on different projected displays within the shared workspace. In certain embodiments, the electronic devices may communicate directly with one another. However, in other embodiments, the electronic devices may communicate through an intermediary device, such as a server.

The electronic devices may include projectors for producing the projected displays, as well as cameras for detecting gestures made with respect to the projected displays. According to certain embodiments, the electronic devices may include a library of gestures that correspond to image sharing commands. For example, different gestures may represent different image sharing commands, such as an image transfer command for moving an image from one projected display to another projected display and an image copy command for displaying a copy of an image on one projected display on another projected display. To share images between projected displays, a user may perform a gesture with respect to the projected displays. The camera for the electronic device producing that projected display may detect the gesture, and in turn, the electronic device may interpret the gesture and perform the associated image sharing command.

Figure 1:
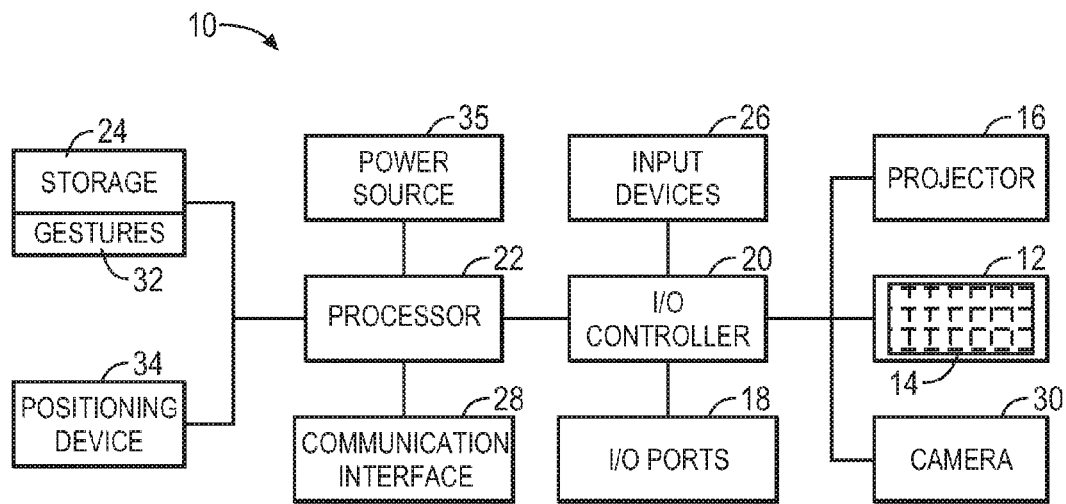
FIG. 1 is a block diagram of exemplary components of an electronic device that may be employed to produce a shared workspace, in accordance with aspects of the present disclosure.

FIG. 1 is a block diagram of an embodiment of an electronic device 10 that may be employed to produce a shared workspace. Electronic device 10 may be any type of electronic device that is capable of displaying projected images and recognizing gestures through a camera. For instance, electronic device 10 may be a media player, a mobile phone, a laptop computer, a desktop computer, a tablet computer, a personal data organizer, a workstation, or the like. According to certain embodiments, electronic device 10 may be a portable electronic device, such as a model of an iPod® or iPhone® available from Apple Inc. of Cupertino, Calif. In other embodiments, electronic device 10 may be a desktop or laptop computer, including a MacBook®, MacBook® Pro, MacBook Air®, iMac®, Mac® Mini, or Mac Pro®, also available from Apple Inc. In further embodiments, electronic device 10 may include other models and/or types of electronic devices employing cameras and projectors.

As shown in FIG. 1, electronic device 10 may include various internal and/or external components that contribute to the function of device 10. The various functional blocks shown in FIG. 1 may include hardware elements (including circuitry), software elements (including computer code stored on a computer-readable medium), or a combination of both hardware and software elements. It should further be noted that FIG. 1 is merely one example of a particular implementation and is intended to illustrate, but not limit, the types of components that may be present in electronic device 10.

Electronic device 10 includes a display 12 that may be used to display image data, which may include stored image data (e.g., picture or video files stored in electronic device 10) and streamed image data (e.g., images received over a network), as well as live captured image data (e.g., photos or video taken using the electronic device 10). Display 12 also may display various images generated by electronic device 10, including a GUI for an operating system or other application. The GUI may include various layers, windows, screens, templates, or other graphical elements that may be displayed in all, or a portion, of display 12. Display 12 may be any suitable display such as a liquid crystal display (LCD), plasma display, or an organic light emitting diode (OLED) display, for example.

According to certain embodiments, display 12 may be provided in conjunction with a touchscreen 14 that may function as part of a control interface for device 10. Touchscreen 14 may be positioned in front of, or behind, display 12 and may be used to select graphical elements shown on display 12. Further, in certain embodiments, touchscreen 14 may be used to move images between projected displays of the shared workspace and/or to set parameters of the shared workspace, such as relative positions of electronic devices included within the shared workspace. Touchscreen 14 may employ any suitable type of touchscreen technology such as resistive, capacitive, infrared, surface acoustic wave, electromagnetic, or near field imaging. Furthermore, touchscreen 14 may employ single point or multipoint sensing.

Display 12 also may operate in conjunction with a projector 16. Although shown as a separate component, in other embodiments, projector 16 may be an integral part of display 12. Further, in certain embodiments, projector 16 may be removably attached to electronic device 10. For example, projector 16 may clip to an external surface of electronic device 10. In these embodiments, projector 16 may be connected to electronic device 10 through an I/O port 18 or through a wireless connection. Projector 16 may be any suitable type of projector, such as a holographic laser projector, a liquid crystal display (LCD) projector, a digital light processing (DLP) projector, a liquid crystal on silicon (LCOS) projector, or a light emitting diode (LED) projector, among others.

I/O ports 18 may include ports configured to connect to a variety of external devices, such as a power source, headset or headphones, or other electronic devices such as computers, printers, projectors, external displays, modems, docking stations, and so forth. I/O ports 18 may support any interface type, such as a universal serial bus (USB) port, a video port, a serial connection port, an IEEE-1394 port, an Ethernet or modem port, and external S-ATA port, and/or an AC/DC power connection port, among others.

An I/O controller 20 may provide the infrastructure for exchanging data between a processor 22 and input/output devices connected through I/O ports 18, as well as other input/output devices, such as display 12, touchscreen 14, and projector 16. I/O controller 20 may contain one or more integrated circuits and may be integrated with processor 22 or may exist as a separate component.

Processor 22 may include one or more processors that provide the processing capability to execute the operating system, programs, user and application interfaces, and any other functions of electronic device 10. Processor 22 may include one or more microprocessors and/or related chip sets. For example, processor 22 may include "general purpose" microprocessors, a combination of general and special purpose microprocessors, instruction set processors, graphics processors, video processors, related chips sets, and/or special purpose microprocessors. Processor 22 also may include on board memory for caching purposes.

Information, such as programs and/or instructions, used by processor 22 may be located within storage 24. Storage 24 may store a variety of information and may be used for various purposes. For example, storage 24 may store firmware for electronic device 10 (such as a basic input/output instruction or operating system instructions), various programs, applications, or routines executed on electronic device 10, user interface functions, processor functions, and so forth. According to certain embodiments, storage 24 may store a program enabling establishment of a shared workspace and/or control of a shared workspace using electronic device 10. In addition, storage 24 may be used for buffering or caching during operation of electronic device 10.

Storage 24 may include any suitable manufacture that includes one or more tangible, computer-readable media. For example, storage 24 may include a volatile memory, such as random access memory (RAM), and/or as a non-volatile memory, such as read-only memory (ROM). The components may further include other forms of computer-readable media, such as non-volatile storage, for persistent storage of data and/or instructions. The non-volatile storage may include flash memory, a hard drive, or any other optical, magnetic, and/or solid-state storage media. The non-volatile storage may be used to store firmware, data files, software, wireless connection information, and any other suitable data.

Electronic device 10 also may include one or more input devices 26 that may be actuated by a user to provide user input or feedback to processor 22. For instance, input devices 26 may be configured to control one or more functions of electronic device 10, applications running on electronic device 10, and/or any interfaces or devices connected to or used by electronic device 10. User interaction with input devices 26, such as to interact with a user or application interface displayed on display 12, may generate electrical signals indicative of the user input. These input signals may be routed through I/O controller 20 via suitable pathways, such as an input hub or bus, to processor 22 for further processing.

By way of example, input devices 26 may include buttons, sliders, switches, control pads, keys, knobs, scroll wheels, keyboards, mice, touchpads, and so forth, or some combination thereof. In one embodiment, input devices 26 may allow a user to navigate a GUI displayed on display 12 to control settings for a shared workspace. Input devices 26 may be used in conjunction with, or independently of, touchscreen 14 to select inputs for electronic device 10.

One or more communication interfaces 28 may provide connectivity channels for receiving and transmitting information and/or for connecting to other electronic devices to establish a shared workspace. Communication interface 28 may represent, for example, one or more network interface cards (NIC) or a network controller. Communication interface 28 may include a local area network (LAN) interface for connecting to a wired Ethernet-based network and/or a wireless LAN, such as an IEEE 802.11x wireless network.

Communication interface 28 also may include a wide area network (WAN) interface that permits connection to the Internet via a cellular data network, such as the Enhanced Data rates for GMS Evolution (EDGE) network or a 3G or 4G network. Further, communication interface 28 may include a personal area network (PAN) interface for connecting to a Bluetooth® network, an IEE 802.15.4 (ZigBee) network, or an ultra wideband network (UWB). Communication interface 28 may include any number and combination of network interfaces. As will be appreciated, communication interface 28 may employ one or more protocols, such as the High-Speed Downlink Packet Access (HSDPA) protocol, for rapidly downloading data over a network. Additionally, communication interface 28 may allow electronic device 10 to receive a software upgrade that enables electronic device 10 to establish and/or control a shared workspace in accordance with certain embodiments.

In certain embodiments, electronic device 10 may use a device identification networking protocol to establish a connection with another electronic device through communication interface 28. For example, both electronic device 10 and the other electronic device may broadcast identification information using Internet protocol (IP). The electronic devices may then use the identification information to establish a network connection, such as a PAN connection or a LAN connection, between the devices. By way of example, the device identification protocol may be Bonjour® by Apple Inc.

Communication interface 28 may further include a near field communication (NFC) device. The NFC device may allow for close range communication at relatively low data rates (424 kb/s), and may comply with standards such as ISO 18092 or ISO 21481, or it may allow for close range communication at relatively high data rates (560 Mbps), and may comply with the TransferJet® protocol. In certain embodiments, the NFC device may be used to receive information, such as the service set identifier (SSID), channel, and encryption key, used to connect through another communication interface, such as a WAN, LAN, or PAN interface.

Electronic device 10 also includes one or more cameras 30 that may be used to acquire still and/or moving images, such as digital photographs or videos. Camera 30 may be any suitable camera, such as a digital video camera employing a charge-coupled device (CCD) sensor, among others. According to certain embodiments, camera 30 may be an iSight® camera available from Apple Inc.

Camera 30 may be designed to detect gestures in the form of shadows and/or silhouettes shown on the projected display created by projector 16. For example, camera 30 may be designed to detect spatial patterns, such as shadows, produced on the projected display. Camera 30 also may be designed to detect movement of an object, such as hand, that produces gestures within the viewing area of camera 30. For example, rather than, or in addition to, detecting shadows on the projected display, camera 30 may detect the movement of the object itself Camera 30 also may be designed to detect x and y spatial directions along the plane of the projected display to determine a direction of the gesture. Further, where two or more cameras are included, cameras 30 may operate in conjunction with one another along the plane of the projected display to detect the z spatial direction, in addition to the x and y spatial directions. For example, the motion of an object with respect to a projected display may be detected in the x and y spatial directions with one camera, or in the x, y, and z spatial directions with two or more cameras.

Camera 30 may operate in conjunction with image processing software included within storage 24 to interpret gestures for sharing or moving images between projected displays of the shared workspace. For example, storage 24 may include a library of gestures 32 that may correlate to image sharing commands that allow a user to move images between different projected displays of the shared workspace. Image processing software may interpret gestures viewed through camera 30 to determine image sharing commands represented by the detected gestures. Processor 22 may then use one or more programs encoded on storage 24 to execute the image sharing commands. For example, camera 30 may detect a gesture that corresponds to an image sharing command to move an image from the current projected display to another projected display. The image processing software may interpret the gesture viewed by camera 30 to identify the image sharing command. Processor 22 may then retrieve and transmit data corresponding to the image to an electronic device for the other projected display to allow the other electronic device to display the image on its projected display.

Electronic device 10 also includes a positioning device 34 designed to determine the geographic location of electronic device 10. For example, positioning device 34 may be a GPS system, such as an Assisted GPS (A-GPS) system. In another example, positioning device 34 may include a device that triangulates wireless access points to determine a location. In yet another example, positioning device 34 may include a radio frequency transmitter that operates in conjunction with a radio frequency mapping system through communication interface 28 to determine a location. According to certain embodiments, processor 22 may use the location information from positioning device 34 to determine the relative positions of electronic devices connected to form the shared workspace.

Electronic device 10 may be powered by a power source 35 that may include one or more batteries and, or alternatively, an AC power source, such as provided by an electrical outlet. In certain embodiments, electronic device 10 may include an integrated power source that may include one or more batteries, such as a Li-Ion battery. In certain embodiments, a proprietary connection I/O port 18 may be used to connect electronic device 10 to a power source for recharging the battery.

Figure 2:
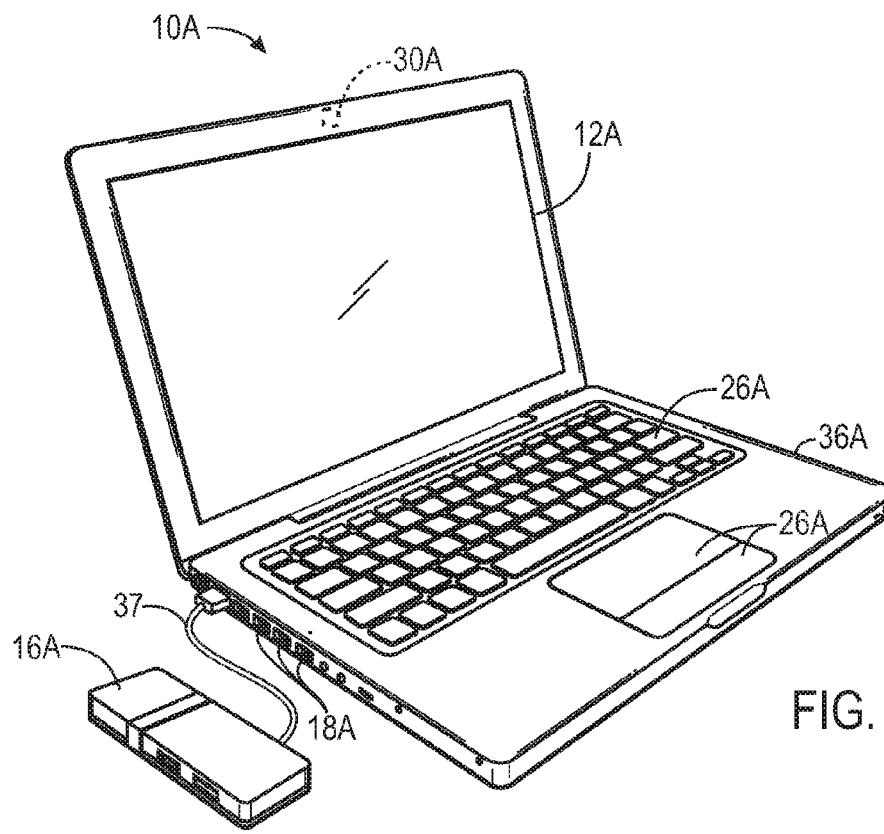
FIG. 2 is a perspective view of a computer in accordance with aspects of the present disclosure.

FIG. 2 depicts an example of an electronic device 10A in the form of a laptop computer. As shown in FIG. 2, electronic device 10A includes a housing 36A that supports and protects interior components, such as processors, circuitry, and controllers, among others. Housing 36A also allows access to user input devices 26A, such as a keypad, touchpad, and buttons, that may be used to interact with electronic device 10A. For example, user input devices 26A may be manipulated by a user to operate a GUI and/or applications running on electronic device 10A. In certain embodiments, input devices 26A may be manipulated by a user to control properties of a shared workspace produced by electronic device 10A.

Electronic device 10A also may include various (I/O) ports 18A that allow connection of electronic device 10A to external devices, such as a power source, printer, network, or other electronic device. For example, electronic device 10A may be connected to an external projector 16A through a cable 37 that connects projector 16A to an I/O port 18A of electronic device 10A. Projector 16A may be used to produce a projected display from electronic device 10A that may form part of a shared workspace. Electronic device 10A also includes camera 30A that may be used to detect gestures on the projected display for controlling the shared workspace. According to certain embodiments, camera 30A may include one or more cameras pointed in multiple directions. For example, camera 30A may be directed towards the front of display 12A to function as a webcam and may be directed towards the back of display 12A to detect gestures for controlling a shared workspace.

Figure 3:
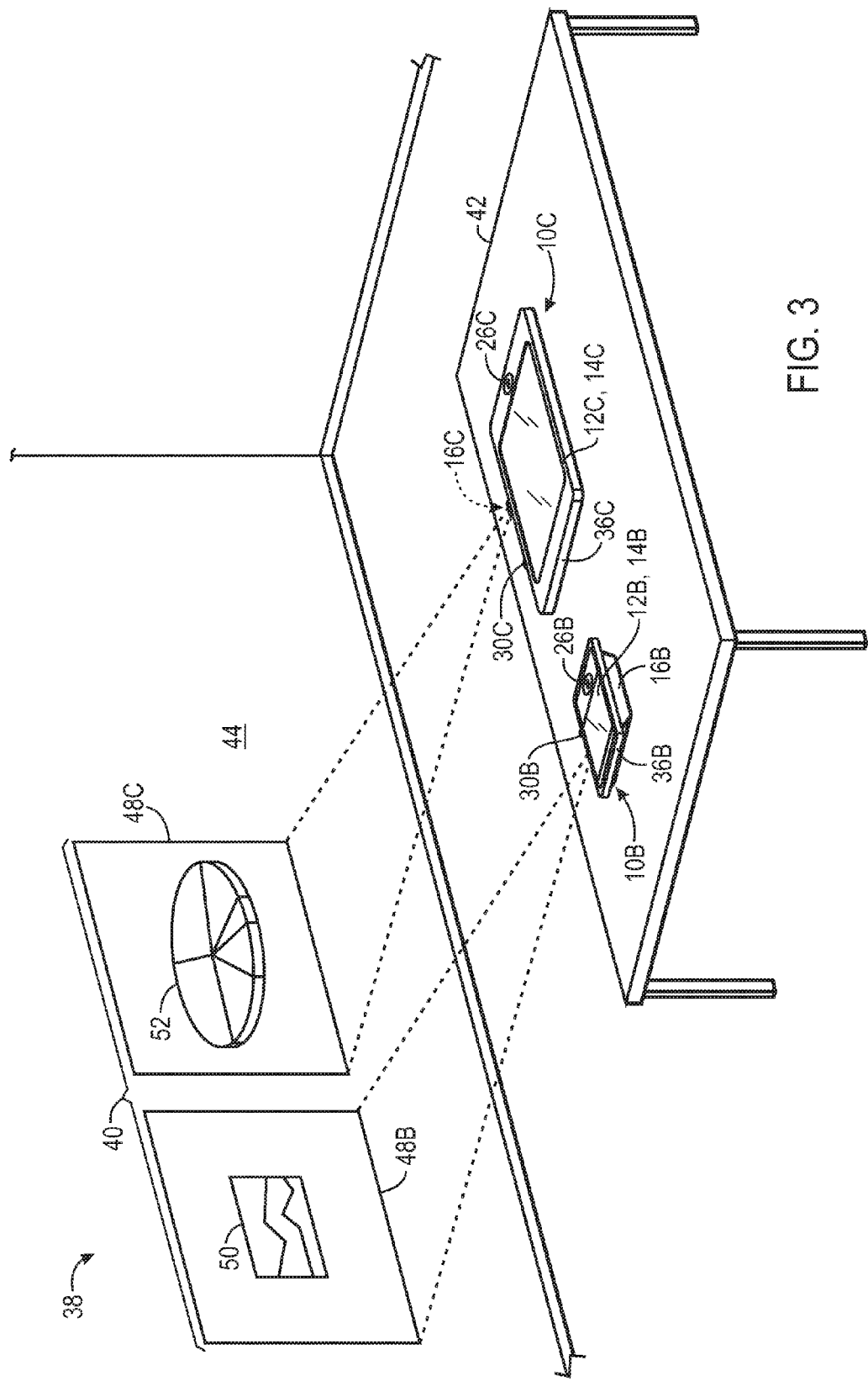
FIG. 3 is a perspective view of a shared workspace system that includes one or more of the electronic devices of FIG. 1, in accordance with aspects of the present disclosure.

FIG. 3 depicts a system 38 of electronic devices 10B and 10C that may be employed to produce a shared workspace 40. As shown, electronic device 10B represents a multifunctional media player that may be used to play videos, take pictures, and make phone calls, and electronic device 10C represents a tablet computer. However, in other embodiments, electronic devices 10B and 10C may be any suitable type of electronic device, such as a portable media player, a desktop computer, a laptop computer, or the like. Moreover, in certain embodiments, electronic devices 10B and 10C may be the same or different type of electronic device.

Each electronic device 10B and 10C includes a projector 16B and 16C, respectively. In the depicted embodiment, electronic device 10B includes an integrated projector 16B, which may be coupled to electronic device 10B through an I/O port 18 (FIG. 1). According to certain embodiments, projector 16B may clip or snap onto housing 36B of electronic device 10B. However, in other embodiments, projector 16B may be disposed within housing 36B. Further, in certain embodiments, projector 16B may be an external device connected to an I/O port 18 (FIG. 1) of electronic device 10B through a connector, such as a cable. In the depicted embodiment, electronic device 10C includes an integral projector 16C disposed within housing 36C. However, in other embodiments, projector 16C may be disposed outside of housing 36C.

Electronic devices 10B and 10C may be placed on a surface 42, such as a table, to produce shared workspace 40 on a surface 44, such as a wall, screen, or whiteboard, among others. In other embodiments, electronic devices 10B and 10C may be held by a user or mounted on a tripod. To produce shared workspace 40, each projector 16B and 16C may produce a projected display 48B and 48C. Projected displays 48B and 48C may be produced within the same location to allow a user to interact with both projected displays 48B and 48C. According to certain embodiments, the projected displays 48B and 48C may be disposed adjacent to each other to form a unified display. However, in other embodiments, the projected displays 48B and 48C may be produced farther apart and/or on separate walls of a location. Further, in certain embodiments, projected displays 48B and 48C may be positioned above and below one another.

In one embodiment, each electronic device 10B and 10C includes an input device 26B or 26C, and a display 12B or 12C with a touchscreen 14B or 14C that may be used to display a GUI that enables a user to interact with shared workspace 40. For example, through touchscreen 14B or 14C, a user may select images 50 and 52 to display on projected displays 48B and 48C. Images 50 and 52 may represent pictures, photographs, video files, audio files, application files, or the like. In another example, through touchscreen 14B or 14C, a user may select a graphical element to initiate an image sharing mode, where images may be transferred between projected displays 48B and 48C.

In particular, when electronic devices operate in an image sharing mode, a communication link may be established between electronic devices 10B and 10C through their respective communication interfaces 28 (FIG. 1). Through the communication link, image data may be transferred between electronic devices 10B and 10C to allow images from one projected display 48B or 48C to be displayed on the other projected display 48C or 48B. For example, a user may transfer image 50 currently shown on projected display 48B to projected display 48C, as described further below with respect to FIG. 4. Image data also may be transferred between electronic devices 10B and 10C to allow images from one projected display 48B or 48C to be displayed on both projected displays 48B and 48C. For example, a user may copy image 50 and display a copy of image 50 on projected display 48C along with the original image 50 that is shown on projected display 48B, as described further below with respect to FIG. 5. In another example, projected displays 48B and 48C may be combined to produce a unified display where a single image may be displayed across both projected displays 48B and 48C, as described further below with respect to FIG. 6.

To share images between projected displays 48B and 48C, a user may perform one or more gestures on a projected display 48B or 48C. Each device 10B and 10C includes one or more cameras 30B and 30C that may be used to detect gestures performed in front of projected displays 48B and 48C. For example, a user may stand adjacent to shared workspace 40 and gesture in front of one or both of projected displays 48B and 48C. The user's gesture may cast a shadow on projected display 48B or 48C that the respective camera 30B or 30C may detect. In other embodiments, camera 30B or 30C may detect the gesture itself, rather than the shadow of the gesture. Electronic device 10B or 10C may interpret the detected gesture and may correlate the gesture with an image sharing command. For example, electronic device 10B or 10C may compare the detected gestures to a library of gestures 32 (FIG. 1) stored within electronic device 10B or 10C.

Image sharing commands may include various types of commands, such as copy or transfer commands, for sharing an image shown on one projected display 48B with one or more other projected displays 48C within shared workspace 40. Each image sharing command may be represented by a different gesture. For example, a user may place a hand or other suitable object in front of an image 50 and may flick his hand to the right to produce a gesture that electronic device 10B recognizes and uses to transfer image 50 from projected display 48B to projected displays 48C. In another example, a user may hold onto an image with a fist and move the fist to the right to produce a gesture that electronic device 10B recognizes as a command to copy image 50 and transfer a copy of image 50 to projected display 48C. In this example, image 50 may then be displayed on both projected displays 48B and 48C. As may be appreciated, these gestures are provided by way of example only, and are not intended to be limiting. Any number of various types of gestures may be associated with different image sharing commands or functionalities.

Figure 4:
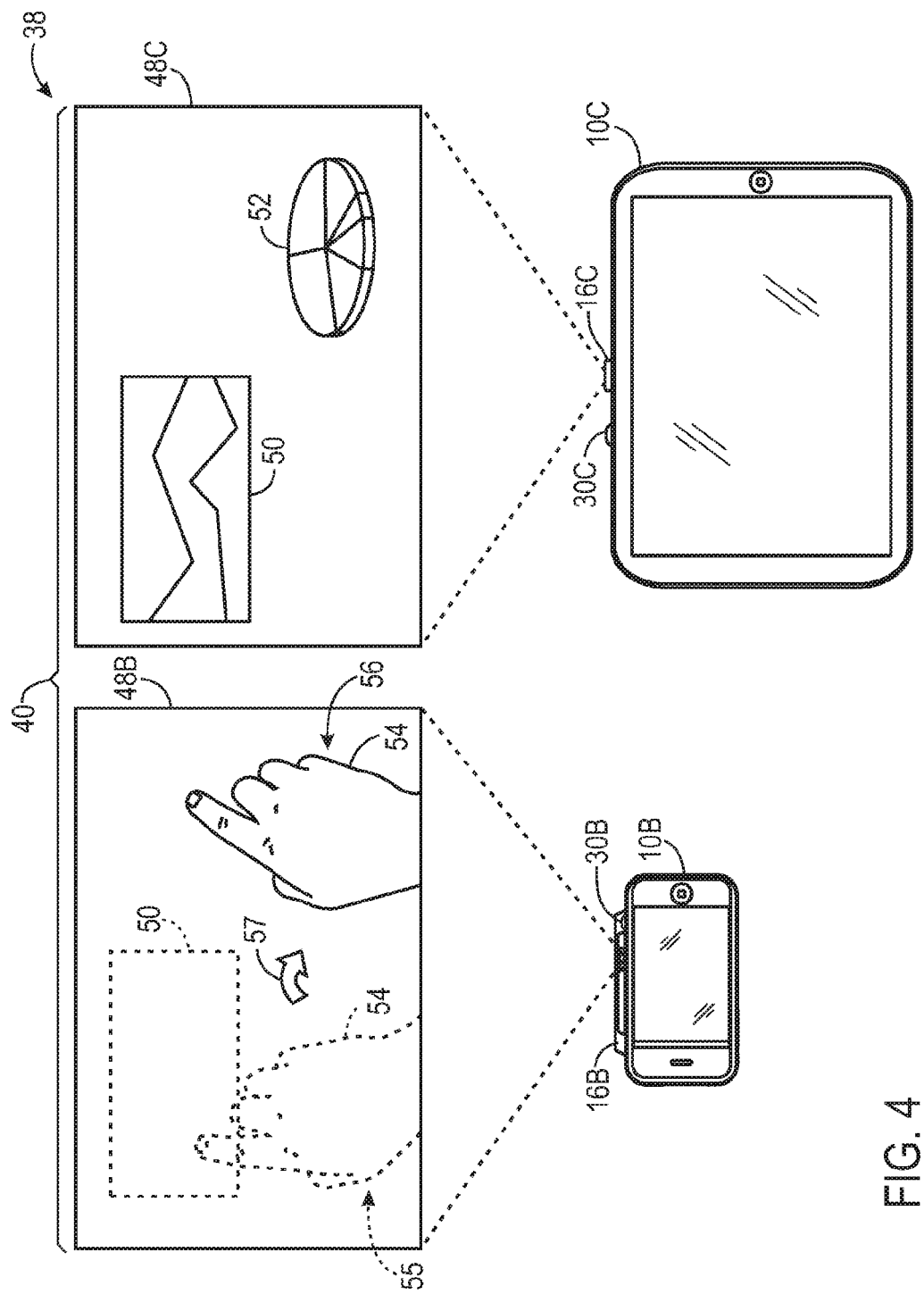
FIG. 4 is a front view of the system of FIG. 3 illustrating a gesture for sharing images within a shared workspace, in accordance with aspects of the present disclosure.

FIG. 4 depicts an example of a gesture that may be employed to transfer images 50 and 52 between projected displays 48B and 48C. To produce a gesture, a user may move an object 54, shown here as a hand, in front of a projected display 48B. Although object 54 is shown here as a hand, in other embodiments, object 54 may represent a pointing device, or other suitable object. To produce the gesture, a user may move object 54 from a first position 55 to a second position 56, as generally shown by an arrow 57. Camera 30B of electronic device 10B may detect the gesture on projected display 48B. In response to detection of the gesture, electronic device 10B may interpret the gesture and perform an image sharing command associated with the gesture.

As shown in FIG. 4, the gesture may correspond to an image sharing command for transferring an image 50 from one projected display 48B to another projected display 48C. In particular, in response to detecting the gesture, electronic devices 10B and 10C have moved image 50 from projected display 48B to projected display 48C. According to certain embodiments, in response to detecting the gesture, electronic device 10B may transmit image data for image 50 to electronic device 10C to enable electronic device 10C to display image 50 on projected display 48C. After transmitting the image data, electronic device 10B may remove image 50 from projected display 48B.

After receiving the image data, electronic device 10C may display image 50 on projected display 48C through projector 16C. Electronic device 10C also may reposition images 50 and 52 shown on projected display 48C to ensure that there is adequate space for displaying all of the images. Further, in certain embodiments, electronic device 10C may resize images 50 and 52 to ensure that the images fit within the display area of projected display 48C. In certain embodiments, electronic devices 10 may store user preferences within storage 24 (FIG. 1) that specify how images 50 and 52 should be resized and/or repositioned.

According to certain embodiments, electronic devices 10 may interpret the gesture based on the shape, direction, speed, acceleration, and/or magnitude of the gesture. Accordingly, a user may vary the shape of object 54, the orientation of object 54, the direction of the gesture, the speed of the gesture, the acceleration of the gesture, and/or the magnitude of the gesture to perform different image sharing commands. For example, a user may display an open palm or a closed fist to perform gestures for executing other types of image sharing commands, such as copying images, displaying images on multiple projected displays, displaying an image on a unified space that includes the projected displays, or exchanging images between projected displays, among others. In another example, a user may change the number of fingers that are extended during the gesture. Further, in certain embodiments, gestures may be performed with multiple objects 54, such as two hands. Moreover, in certain embodiments, gestures may include a series of separate motions.

In certain embodiments, gestures also may be used to collect a series of images that may be shared between projected displays 48B and 48C. For example, a user may perform a gesture, such as a two-finger tap, to select multiple images and group the multiple images together. A user may then perform a subsequent gesture that corresponds to an image sharing command. For example, a user may perform a gesture that corresponds to moving an image from one projected display 48B to another projected display 48C as shown in FIG. 4. In response to detecting the gesture, electronic devices 10B and 10C may then perform the image sharing command for the entire group of selected images. For example, the group of selected images may be moved from one projected display 48B to another projected display 48C. The grouping of images may allow for mass sharing or copying of images between projected displays 48B and 48C. Further, in certain embodiments, the grouping of images may allow for the mass uniform display of multiple images on a unified space that includes projected displays 48B and 48C.

Figure 5:
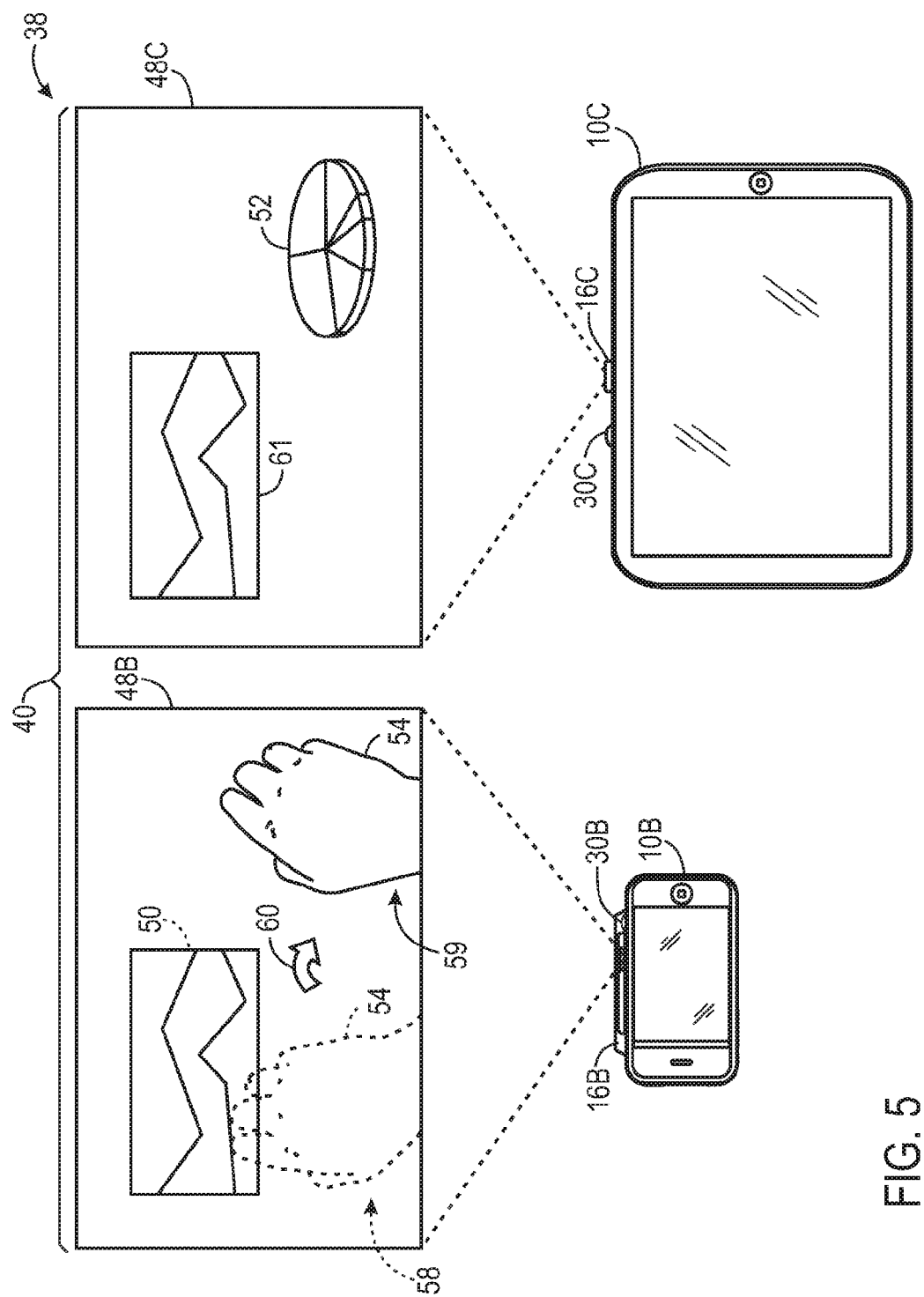
FIG. 5 is a front view of the system of FIG. 3 illustrating another gesture for sharing images within a shared workspace, in accordance with aspects of the present disclosure.

FIG. 5 depicts another example of a gesture that may be used to share images between projected displays 48B and 48C. In this example, a user may arrange object 54 into a fist that moves from a first position 58 to a second position 59 as shown by an arrow 60. Camera 30B may detect the gesture, and electronic device 10B may interpret the gesture to retrieve an imaging sharing command associated with the detected gesture. As shown in FIG. 5, the gesture may represent a copy command for producing a copy of an image on another projected display 48C. In particular, in response to detecting the gesture, electronic devices 10B and 10C have produced a copy 61 of image 50 that is shown on projected display 48C. According to certain embodiments, in response to detecting the gesture, electronic device 10B may transmit image data for image 50 to electronic device 10C to enable electronic device 10C to display the copy 61 of image 50 on projected display 48C. Rather than removing image 50 from projected display 48B, electronic device 10B may continue to display image 50 on projected display 48B so that image 50 and copy 61 of image 50 are displayed simultaneously.

Figure 6:
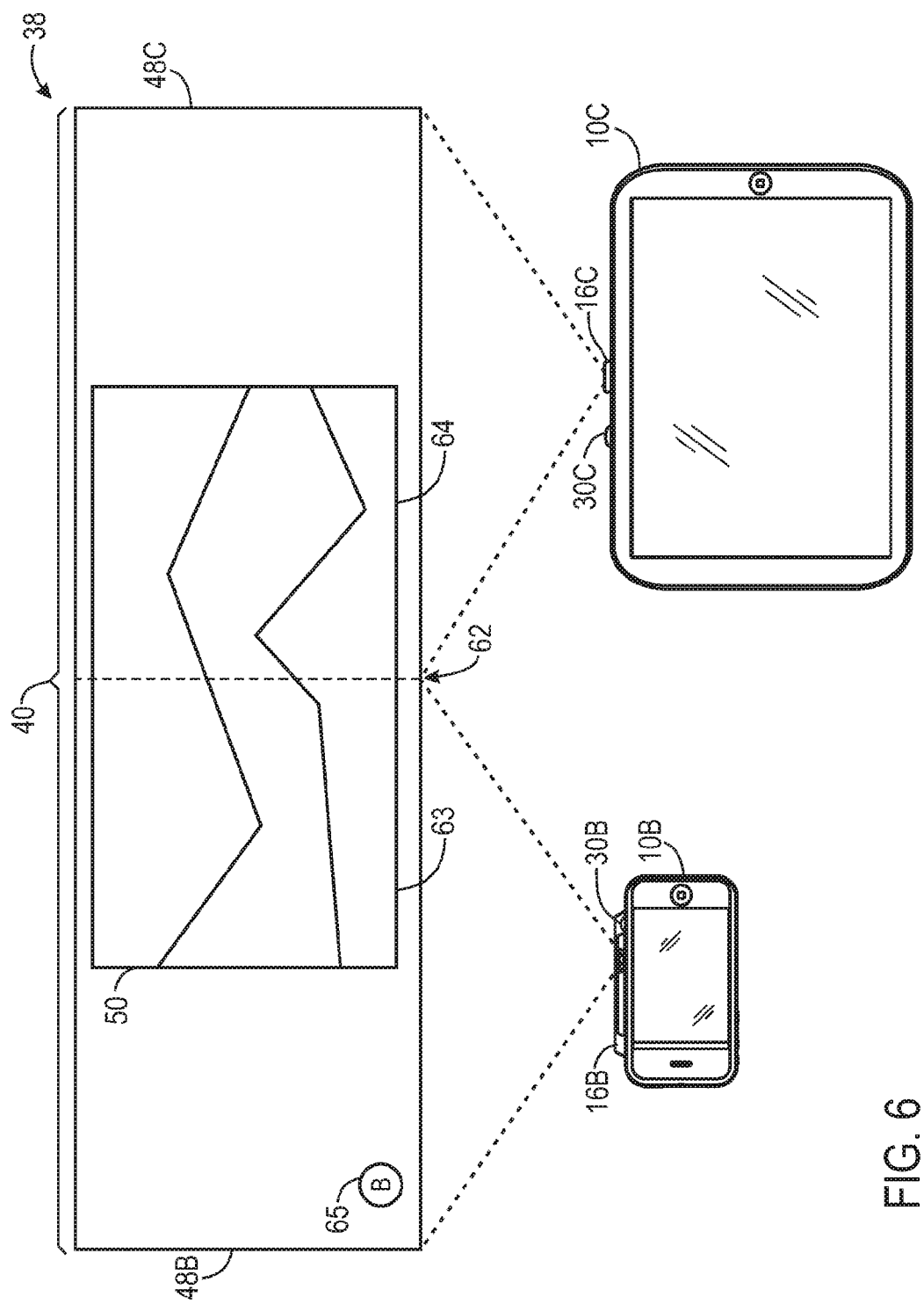
FIG. 6 is a front view of the system of FIG. 3 illustrating a unified display mode for a shared workspace, in accordance with aspects of the present disclosure.

FIG. 6 depicts another embodiment of shared workspace 40 that may operate in a unified display mode. In the unified display mode, projected displays 48B and 48C may be combined to produce a unified display 62 that allows individual images to be displayed across two or more projected displays 48B and 48C within shared workspace 40. For example, in the illustrated embodiment, image 50 is displayed across projected displays 48B and 48C. In other embodiments, unified display 62 may include three or more projected displays 48 produced by three or more electronic devices 10. In these embodiments, images may be transferred and/or shared between any of the projected displays 48 included within unified display 62.

The unified display mode may be enabled in response to receiving a gesture and/or in response to receiving a user input. In certain embodiments, the shape, direction, acceleration, and/or magnitude of the gesture may determine which projected displays 48B and 48C should be combined to form unified display 62. When the unified display mode is enabled, electronic devices 10B and 10C may adjust projected displays 48B and 48C to create unified display 62. For example, in the illustrated embodiment, electronic devices 10B and 10C have extended projected displays 48B and 48C towards one another to form a contiguous display without space between projected displays 48B and 48C. In addition to minimizing the space between projected displays 48B and 48C, electronic devices 10B and 10C may also minimize or reduce the overlap between projected displays 48B and 48C.

The creation of unified display 62 may allow an individual image 50 to be displayed using both projected displays 48B and 48C. A user may select an image 50 to display on unified display 62 using a gesture and/or through a user input on one of electronic devices 10B or 10C. In response to detecting the gesture or user input, electronic devices 10B and 10C may display a portion 63 of image 50 on projected display 48B while another portion 64 of image 50 is displayed on projected display 48C. The portions 63 and 64 may be displayed contiguous to one another to form the complete image 50.

According to certain embodiments, a user may perform gestures to control the display of images 50 on unified display 62. For example, a user may perform various gestures to enlarge or reduce the size of an image 50, to move an image 50, and/or to rotate an image 50. One or both cameras 30B and 30C may detect the gesture and vary the display of image 50 in response to detecting the gesture.

In certain embodiments, to facilitate control of unified display 62, one of the electronic devices 10B may be designated as the master device while the other electronic devices 10C function as slave devices. An indicator 65 may be displayed on unified display 62 to facilitate identification of the master electronic device 10B. The master electronic device 10B may then be used to control the display of images on unified display 62. For example, a user may select images to display on unified display 62 through a GUI of electronic device 10B and/or through gestures detected by camera 30B. In certain embodiments, the master electronic device 10B may provide control signals to the slave electronic devices 10C, for example, through communication interfaces 28 (FIG. 1), to control the display of images 50 on unified display 62. Further, in certain embodiments, through a GUI of electronic device 10B or through a gesture, a user may be able to change the electronic device 10B or 10C that is designated as the master electronic device.

As described above with respect to FIGS. 4 through 6, the shape, direction, speed, acceleration, and/or magnitude of a gesture may be used by electronic device 10 to identify an image sharing command. Further, in certain embodiments, the shape, direction, speed, acceleration, and/or magnitude of a gesture may be used to determine the projected display 48 that receives a shared image. Using the shape, direction, speed, acceleration, and/or magnitude of a gesture to determine a recipient projected display 48 may be particularly important in systems 38 with three or more connected electronic devices 10 that produce three or more projected displays 48.

Figure 7:
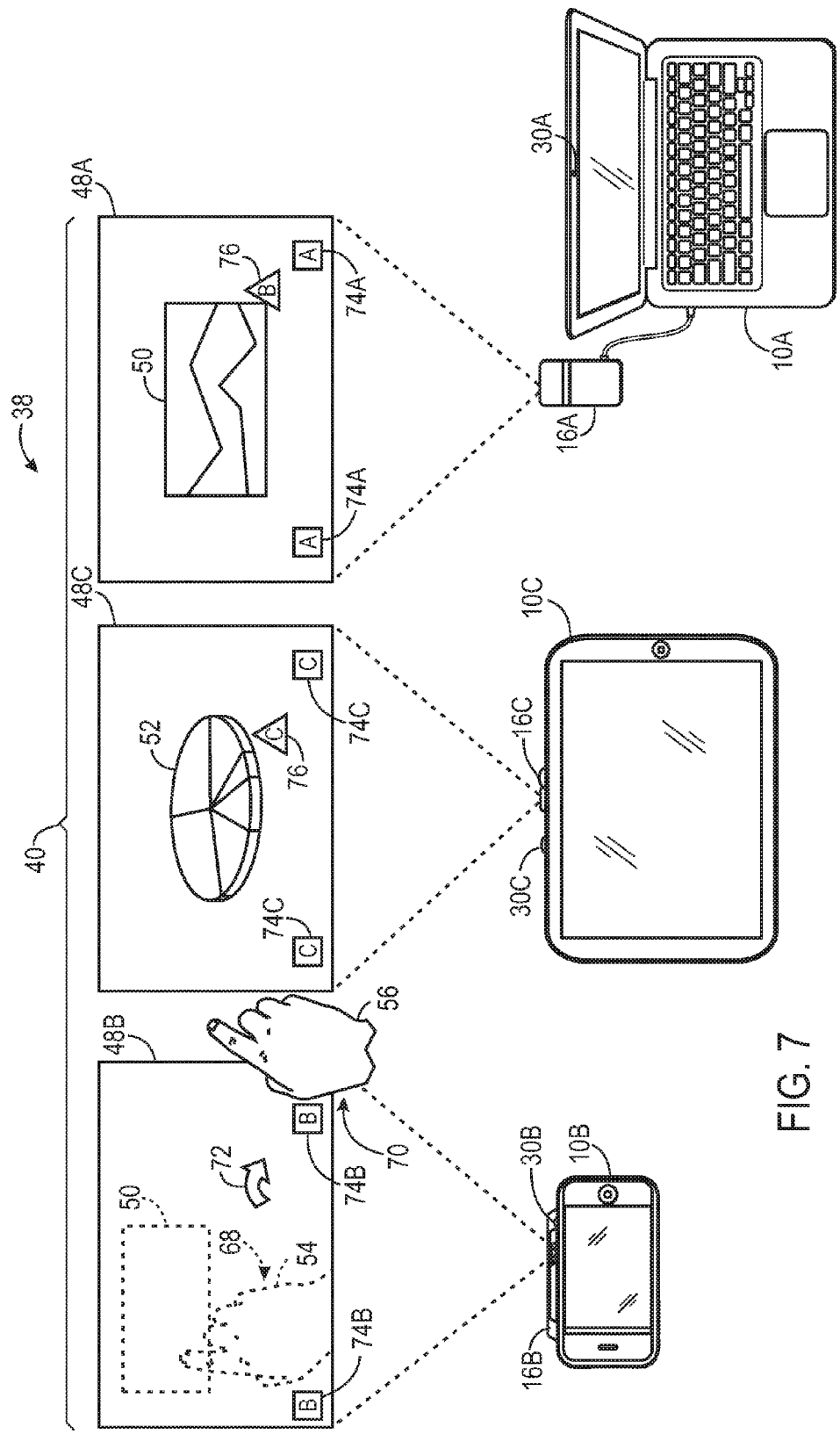
FIG. 7 is a front view of another embodiment of a shared workspace system, in accordance with aspects of the present disclosure.

FIG. 7 depicts an embodiment of system 38 that includes three connected electronic devices 10A, 10B, and 10C that produce three projected displays 48A, 48B, and 48C within shared workspace 40. In particular, electronic device 10A produces projected display 48A; electronic device 10B produces projected display 48B; and electronic device 10C produces projected display 48C. Images 50 and 52 may be shared across projected displays 48A, 48B, and 48C to produce shared workspace 40. In certain embodiments, images 50 and 52 may be shared between projected displays 48A, 48B, and 48C in a discrete image sharing mode where an individual image is transferred or copied between projected displays 48A, 48B, and 48C. Further, in certain embodiments, projected displays 48A, 48B, and 48C may be combined to form a unified display that allows for individual images to be displayed across two or three of the projected displays 48A, 48B, and 48C, as described above with respect to FIG. 6. Moreover, in other embodiments, projected displays 48A, 48B, and 48C may be arranged in an omnidirectional orientation with projected displays 48A, 48B, and 48C located above and below on another or diagonal with respect to one another in addition to, or instead of, being arranged next to one another as shown in FIG. 7.

In addition to determining an image sharing command, the shape, direction, speed, acceleration, and/or magnitude of a gesture may determine the projected display 48A, 48B, or 48C that receives a shared image. For example, as illustrated in FIG. 7, a user may produce a gesture that moves object 54 from a first position 68 to a second position 70, as illustrated by arrow 72. The projected display 48B, on which the gesture is performed, may generally be referred to as the initiating projected display 48B. The shape and direction of the gesture in FIG. 7 is similar to the gesture shown in FIG. 4. However, as indicated by arrow 72, which is larger than arrow 57 shown in FIG. 4, the gesture of FIG. 7 is much larger in magnitude than the gesture shown in FIG. 4. Indeed, second position 70, shown in FIG. 7, is disposed almost completely outside of projected display 48B, while second position 56, shown in FIG. 4, is disposed within projected display 48B. The larger magnitude of the gesture shown in FIG. 7 may indicate that image 50 should be displayed on the farthest projected display 48A, rather than the adjacent projected display 48C.

According to certain embodiments, the magnitude of a gesture may be increased to share an image with a projected display 48A that is farther away from the initiating projected display 48B, and may be decreased to share an image with a projected display 48C that is closer to the initiating projected display 48B. Further, the direction of the gesture may indicate whether the recipient projected display 48 is located to the left or to the right of the initiating projected display 48B. For example, a gesture to the right may indicate that the recipient projected display is located to the right of the initiating projected display 48B, while a gesture to the left may indicate that the recipient projected display 48 is located to the left of the initiating projected display 48B.

Further, in certain embodiments, the projected displays 48 may be arranged in a circular interface where gestures to the right and left may be used to select projected displays 48 in succession. For example, a gesture to the left may be made on projected display 48B shown in FIG. 6. In this embodiment, since there is no projected display 48 to the left of projected display 48B, the gesture may be used to select projected display 48A as the recipient display. In other words, electronic devices 10 may be designed to select the last projected display 48 in the opposite direction if there is no projected display 48 located in the direction specified.

In other embodiments, the shape of a gesture may determine the recipient projected display 48. For example, the arc of the gesture may be varied to simulate tossing an image to the recipient projected display. The arc of a gesture may be increased to select a recipient projected display 48 that is farther away, which may simulate tossing the image over the projected displays disposed between the initiating projected display and the recipient projected display. Similarly, the arc of a gesture may be decreased to select a recipient projected display that is closer to the initiating projected display. In another example, each of the projected displays 48 within shared workspace 40 may be assigned a different number. A gesture may be made with a number of extended fingers corresponding to the number of the recipient projected display 48. For example, as shown in FIG. 7, projected display 48A may be assigned the number two. The gesture may then be made with two extended fingers to share image 50 with projected display 48A.

According to certain embodiments, position identifiers 74A, 74B, and 74C may be employed to determine the relative positions of projected displays 48A, 48B, and 48C and their associated electronic devices 10A, 10B, and 10C. Position identifiers 74A, 74B, and 74C may display a visual image, such as a letter, number, picture, barcode, or the like, that identifies the electronic device 10A, 10B, or 10C associated with a projected display 48A, 48B, or 48C. For example, in addition to displaying images 50 and 52, each projected display 48A, 48B, and 48C may display one or more position identifiers 74A, 74B, 74C that identify the electronic device 10A, 10B, or 10C associated with that projected display 48A, 48B, or 48C.

Cameras 30A, 30B, and 30C each may have a wider viewing area than the display area of projected displays 48A, 48B, and 48C. The wider viewing area may allow cameras 30A, 30B, and 30C to view a portion of, or all of, the neighboring projected display 48A, 48B, or 48C. For example, projected display 48C may include two position identifiers 74C each located in one corner of projected display 48C. Neighboring electronic device 10A may view one or more of the position identifiers 74C through camera 30A. Electronic device 10A may process the position identifier 74C to establish that electronic device 10C is located to the left of electronic device 10A.

In another example, electronic device 10C may view position identifiers 74B and 74A through camera 30C to establish that electronic device 10A is located to the right of electronic device 10C and that electronic device 10B is located to the left of electronic device 10C. Electronic devices 10A, 10B, and 10C may communicate with each other through communication interfaces 28 (FIG. 1) to determine the relative positions of each of the electronic devices 10A, 10B, and 10C. Electronic devices 10A, 10B, and 10C may then use the relative locations in conjunction with the detected gesture to determine which projected display should receive a shared image.

In other embodiments, instead of, or in addition to, using position identifiers 74A, 74B, and 74C to determine the relative positions of electronic devices 10A, 10B, and 10C, the relative positions may be determined using positioning devices 34 included within each of the electronic devices 10A, 10B, and 10C. As described above with respect to FIG. 1, positioning devices 34 may include global positioning devices, wireless access point triangulation devices, and/or radio frequency transmitters, among others, that may be used to determine the locations of electronic devices 10A, 10B, and 10C to within a few feet or yards. The locations of each electronic device 10A, 10B, and 10C may then be compared to one another to determine the relative positions of electronic devices 10A, 10B, and 10C. Further, in certain embodiments, positioning devices 34 may be employed to detect movement of electronic devices 10A, 10B, and 10C with respect to one another and to adjust the relative positions of electronic devices 10A, 10B, and 10C after movement of one or more of electronic devices 10A, 10B, and 10C.

In certain embodiments, a user may enter orientation information that may be used in conjunction with positioning devices 34 to determine the relative positions of electronic devices 10A, 10B, and 10C. For example, through a GUI of an electronic device 10 included within workspace 40, a user may specify whether an electronic device 10 is positioned to project towards the north, south, east, or west. The orientation information may allow the electronic devices 10A, 10B, and 10C to determine the direction of projection for each device in addition to the geographic positions.

In addition to displaying position identifiers 74A, 74B, and 74C, projected displays 48A, 48B, and 48C may display image source identifiers 76. Image source identifiers 76 each may be associated with a certain image 50 or 52 to identify the electronic device 10A, 10B, 10C that is the source of the image 50 or 52. For example, as shown in FIG. 6, image 52 was initially generated through electronic device 10C, and accordingly, image 52 includes an image identifier 76 that identifies electronic device 10C. In another example, image 50 was initially generated using electronic device 10B, and accordingly, image 50 includes an image identifier 76 that identifies electronic device 10B. Even though image 50 has been transferred to projected display 48A from projected display 48B, image 50 still includes image identifier 76, which identifies the source of image 50 as electronic device 10B. Image source identifiers 76 may allow the source of an image 50 or 52 to be identified even after multiple transfers of an image to different projected displays 48A, 48B, and 48C.

According to certain embodiments, image identifiers 76 may allow an electronic device 10A, 10B, or 10C to identify the electronic device 10A, 10B, or 10C that stores the image data associated with an image 50 or 52. For example, a user may produce a gesture on projected display 48A to transfer image 50 from projected display 48A to projected display 48C. Upon detecting the gesture, electronic device 10A may view image source identifier 76 and, in certain embodiments, may transfer the image data for image 50 to electronic device 10C. However, in other embodiments, electronic device 10A may send a communication to electronic device 10B through communication interface 28 (FIG. 1) to request that electronic device 10B, which stores the original image data for image 50, transmit the image data to electronic device 10C.

Image identifiers 76 also may identify a version of the source file associated with an image 50 or 52. For example, after an image has been shared between projected displays 48A, 48B, and 48C, multiple users may be able to edit the image. The image identifier 76 may allow a user to identify which version of the image is currently displayed on the projected display 48A, 48B, or 48C. Further, as a user edits an image, the image identifier 76 may be updated to reflect the next version. Moreover, in certain embodiments, version information identifying the current version, the changes made, and/or the author of the changes may be stored by one or more of the electronic devices 10A, 10B, and 10C and/or by an external server. A user may access the version information through one of the electronic devices 10A, 10B, and 10C to retrieve a history of changes and/or to retrieve a previous version of an image.

Figure 8:
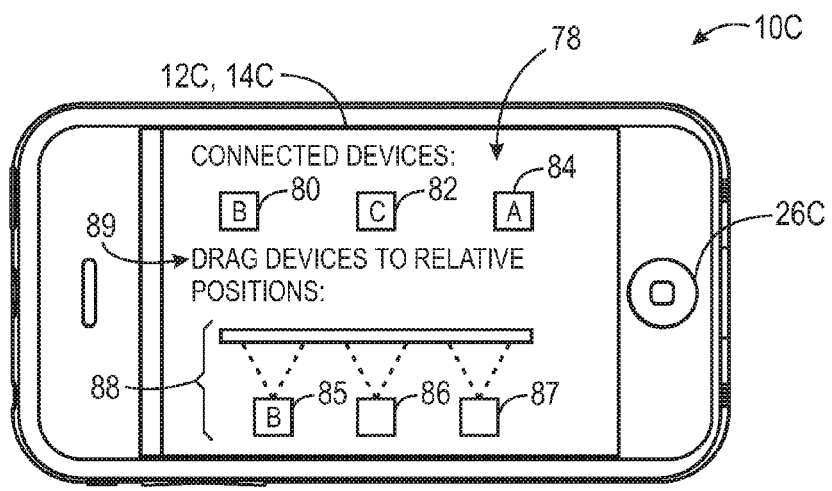
FIG. 8 is a front view of a GUI screen that may be employed to assign electronic device positions within the system of FIG. 7, in accordance with aspects of the present disclosure.

A user also may employ a GUI of one or more of the electronic devices 10A, 10B, and 10C to specify the relative positions of electronic devices 10A, 10B, and 10C. For example, as shown in FIG. 8, electronic device 10C may display a screen 78 of the GUI on display 12C. A user may interact with the GUI via display 12C, touchscreen 14C, and/or input devices 26C to specify the relative positions of electronic devices 10A, 10B, and 10C. Further, in certain embodiments, screen 78 may include an indicator that identifies one of the electronic devices 10A, 10B, or 10C as the master device when a unified display mode is enable as described above with respect to FIG. 6. Through the GUI, a user also may be able to change the electronic device 10A, 10B, or 10C that is specified as the master device.

According to certain embodiments, screen 78 may include graphical elements 80, 82, and 84 that represent each of the electronic devices 10A, 10B, and 10C included within shared workspace 40 (FIG. 6). Graphical elements 80, 82, and 84 may display text, graphics, and/or images that identify electronic devices 10A, 10B, and 10C. For example, graphical elements 80, 82, and 84 may display a name of the electronic device 10, a name of the owner of the electronic device 10, a phone number for the electronic device 10, a model number, a serial number, or a virtual representation of the electronic device 10, among others. As shown, graphical element 80 represents electronic device 10A; graphical element 82 represents electronic device 10B; and graphical element 84 represents electronic device 10C.

Screen 78 also includes areas 85, 86, and 87 representing the relative positions of electronic devices 10A, 10B, and 10C within a graphical representation 88 of shared workspace 40. Instructions 89 may prompt a user to drag graphical elements 80, 82, and 84 to the relative positions defined by areas 85, 86, and 87. For example, as shown in FIG. 7, electronic device 10B is located in the leftmost position; and accordingly, a user has moved graphical element 82 to area 85, which represents the leftmost position. In other embodiments, instead of, or in addition to, moving graphical elements 80, 82, and 84, a user may enter the relative location using another input device 26C included within electronic device 10. For example, a user may select one of the areas 85, 86, or 87 to display a virtual keyboard that may be used to enter text identifying the electronic device 10 positioned in the location corresponding to that area 85, 86, or 87. In another example, a mouse, touchpad, or keyboard may be employed to assign the relative positions to electronic devise 10A, 10B, and 10C.

Figure 9:
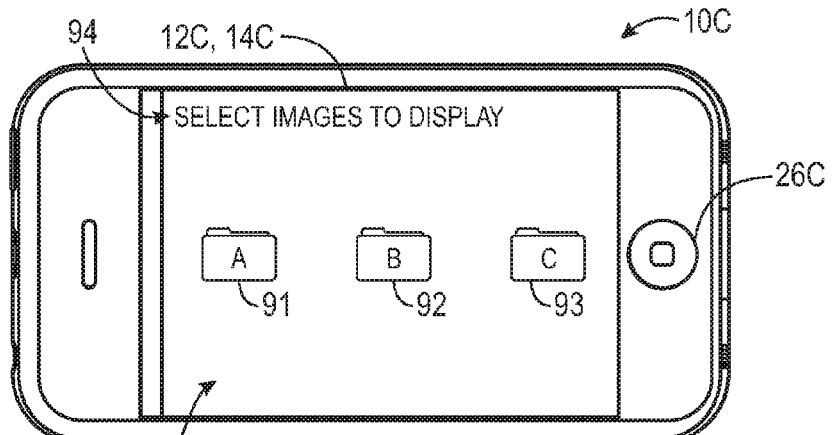
FIG. 9 is a front view of a GUI screen that may be employed to select images for display on the shared workspace, in accordance with aspects of the present disclosure.

As shown in FIG. 9, a user also may employ a GUI to select images to display on projected displays 48 (FIG. 7). Through the GUI, a user may access images from any of the electronic devices 10A, 10B, and 10C included within shared workspace 40. For example, electronic device 10C may display a screen 90 with virtual folders 91, 92, and 93 that may be selected to retrieve images stored on corresponding electronic devices 10A, 10B, and 10C. Instructions 94 may prompt a user to select images for display using virtual folders 91, 92, and 93.

In response to selection of a virtual folder 91, 92, or 93, electronic device 10C may display image representations, such as icons, file names, or the like, that represent images stored on the corresponding electronic device 10A, 10B, or 10C. The image representations may be selected to choose the corresponding image for display on projected displays 48. According to certain embodiments, electronic device 10C may access the images stored on another electronic device 10A or 10B through communication interface 28 (FIG. 1). Once an image is selected, electronic device 10C may then display the selected image on the corresponding projected display 48C (FIG. 7). Further, in certain embodiments, a user may select the image representations to move images stored on one electronic device 10A, 10B, or 10C to another electronic device 10A, 10B, or 10C. For example, a user may drag an image representation to a virtual folder 91, 92, or 93 to move or copy the corresponding image to the electronic device 10A, 10B, or 10C associated with that virtual folder 91, 92, or 93.

In other embodiments, instead of, or in addition to, virtual folders 91, 92, and 93, other types of file retrieval features, such as file directories, search features, or navigation systems, may be employed to select images to display on projected displays 48. For example, in certain embodiments, icons representing each of the electronic devices 10A, 10B, and 10C may be displayed on screen 90. In another example, screen 90 may be divided into separate areas each corresponding to an electronic device 10A, 10B, and 10C. Image representations may then be displayed within the corresponding area of screen 90. For example, image representations for images stored on electronic device 10A may be displayed within one area while image representations for images stored on electronic device 10B may be displayed within another area. Further, in other embodiments, image representations may be displayed for images that are stored on an external device, such as a server.

Figure 10:
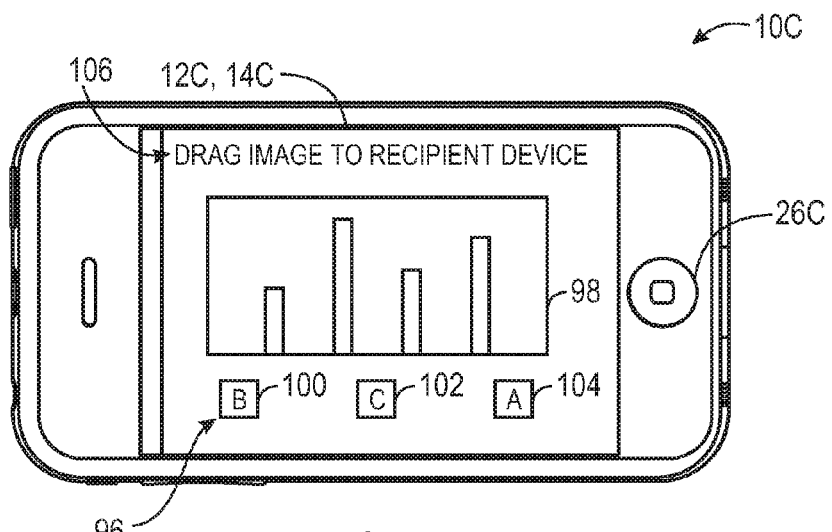
FIG. 10 is a front view of a GUI screen that may be employed to transfer images between projected displays within the system of FIG. 7, in accordance with aspects of the present disclosure.

A user also may employ a GUI to share or move images between projected displays 48 (FIG. 7). The GUI may be employed to select image sharing commands instead of, or in addition to, performing gestures in front of projected display 48 as described above with respect to FIGS. 4 through 7. For example, as shown in FIG. 10, electronic device 10C may display a screen 96 that shows an image 98 that may be shared between projected displays 48 (FIG. 7).

Screen 96 also includes graphical elements 100, 102, and 104 that represent electronic devices 10B, 10C, and 10A included within shared workspace 40. Graphical elements 100, 102, and 104 may display text, graphics, and/or images that identify electronic devices 10A, 10B, and 10C. As shown, graphical element 100 represents electronic device 10B; graphical element 102 represents electronic device 10C; and graphical element 104 represents electronic device 10A. According to certain embodiments, graphical elements 100, 102, and 104 may be positioned on screen 96 in an order that corresponds to the relative positions of the electronic devices 10. However, in other embodiments, graphical elements 100, 102, and 104 may be shown in locations independent of the actual positions of electronic devices 10.

Screen 96 also includes instructions 106 that prompt a user to drag image 98 to a recipient electronic device 10 for display on the projected display 48 produced by the recipient electronic device 10. For example, a user may drag image 98 to graphical element 100 to show image 98 on projected display 48B. As shown in FIG. 10, a user may interact with the GUI through touchscreen 14C. However, in other embodiments, other input devices 26, such as a keyboard, touchpad, or the like, may be employed to interact with the GUI. In response to receiving the user input through touchscreen 14, electronic device 10C may transmit image data for image 98 to the selected recipient electronic device 10. The recipient electronic device 10 may then display image 98 on its projected display 48.

Further, in certain embodiments, instead of, or in addition to, displaying an image 98 on screen 96, a file retrieval feature, such as a table of contents, file directory, and/or a search feature, may be displayed that allows a user to access images available for sharing. As discussed above with respect to FIG. 3, the images may represent photographs, pictures, graphical representations, application files, audio files, sound files, or the like. The file retrieval feature may be shown on display 12 to allow a user to select images for sharing through touchscreen 14 or input devices 26. Moreover, in certain embodiments, the file retrieval feature may be shown on projected display 48 to allow a user to select images for sharing using gestures.

Figure 11:
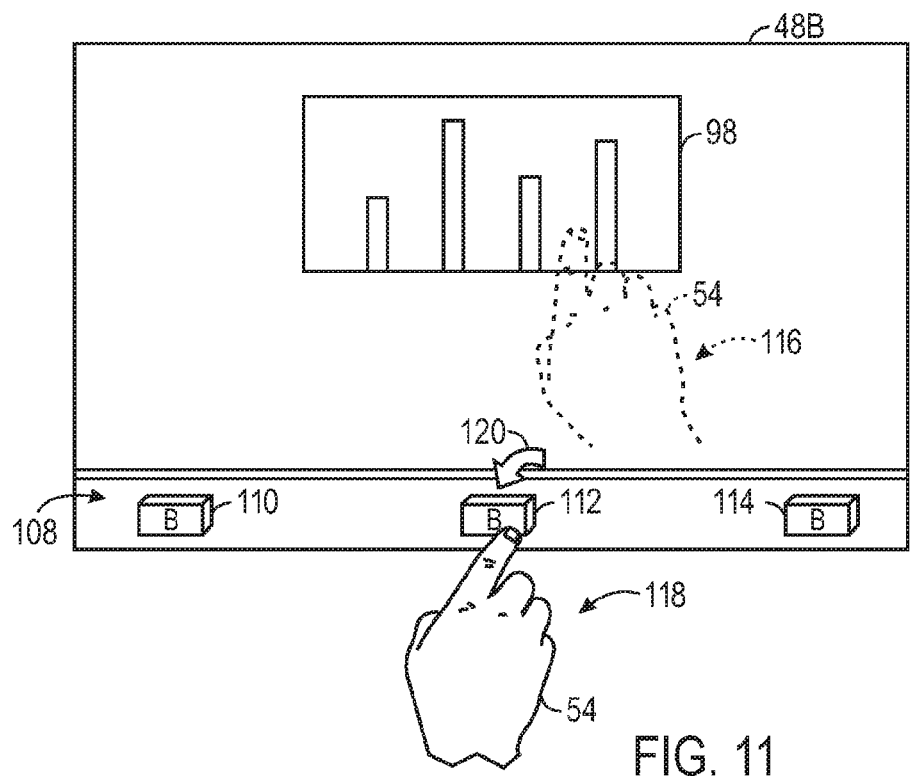
FIG. 11 is a front view of an embodiment of a projected display of FIG. 7 that facilitates gestures for sharing images within a shared workspace, in accordance with aspects of the present disclosure.
Figure 12:
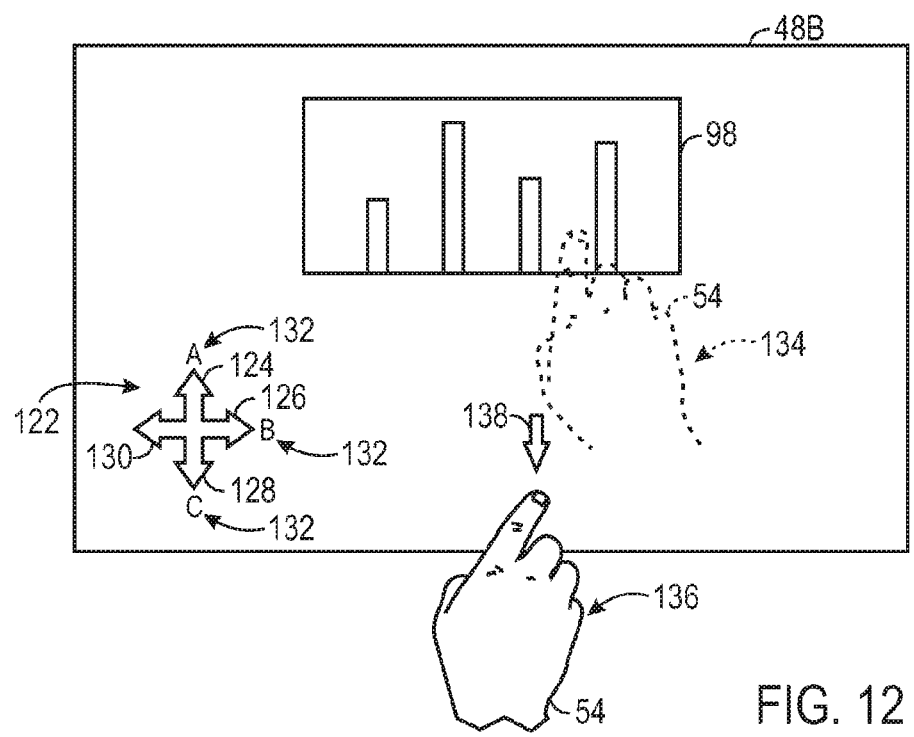
FIG. 12 is a front view of another embodiment of a projected display of FIG. 7 that facilitate gestures for sharing images within a shared workspace, in accordance with aspects of the present disclosure.

As shown in FIGS. 11 and 12, components of the GUI also may be displayed on projected displays 48 to facilitate performance of gestures for sharing images within a shared workspace. For example, as shown in FIG. 11, a graphical representation 108 of shared workspace 40 may be shown on projected display 48B. In particular, projector 16B (FIG. 7) may project graphical representation 108 onto projected display 48B. Graphical representation 108 includes virtual bins 110, 112, and 114, each corresponding to one of the projected displays 48 within shared workspace 40. As shown, virtual bin 110 represents projected display 48B; virtual bin 112 represents projected display 48C; and virtual bin 114 represents projected display 48A. Although graphical representation 108 is shown at the bottom of projected display 48B, in other embodiments, graphical representation 108 may be shown in other locations, such as the top and/or sides of projected display 48B.

To share an image with another projected display 48, a user may perform a gesture that moves an image to a virtual bin 110, 112, or 114 shown within graphical representation 108. For example, a user may perform a gesture that moves image 98 to virtual bin 112 to display image 98 on projected display 48C (FIG. 7). In particular, in the illustrated embodiment, a user has moved object 54 from a first position 116 proximate to image 98 to an ending position 118 proximate to virtual bin 112, as generally indicated by an arrow 120. The ending position 118 of the gesture may determine which recipient projected display 48 receives the shared image. For example, because ending position 118 is proximate to virtual bin 112, which corresponds to projected display 48C, projected display 48C may be the recipient projected display. Camera 30B (FIG. 7) may detect the gesture, and electronic device 10B may transmit image data for image 98 to electronic device 10C to enable display of image 98 on projected display 48C.

According to certain embodiments, the shape of object 54 may determine the image sharing command to be performed. For example, as shown, object 54 represents a hand with one finger extended, which may correspond to a command that moves image 98 from one projected display 48 to another projected display 48. The shape of object 54 may be varied to perform other image sharing commands. For example, in certain embodiments, object 54 may be made into a fist to perform an image sharing command that copies image 98 from one projected display 48 to another projected display 48.

FIG. 12 depicts another embodiment where part of the GUI may be projected onto the projected display 48 to facilitate performance of gestures for sharing images within a shared workspace. As shown in FIG. 12, a legend 122 is shown on projected display 48B to identify gesture directions 124, 126, 128, and 130 that correspond to projected displays 48. Labels 132 identify the projected display 48 that corresponds to each gesture direction 124, 126, 128, and 130. For example, in the illustrated embodiment, up direction 124 corresponds to projected display 48A (FIG. 7); right direction 126 corresponds to projected display 48B; and down direction 128 corresponds to projected display 48C (FIG. 7). Because only three projected displays 48 are included within shared workspace 40 (FIG. 7), a projected display is not associated with left direction 130. However, in other embodiments where shared workspace 40 includes four or more projected displays, left direction 130 may correspond to a projected display. Further, in other embodiments, any number of directions 124, 126, 128, and 130 may be included within legend 122. For example, according to certain embodiments, eight different directions, such as up, down, right, left, diagonal to the upper right corner, diagonal to the lower right corner, diagonal to the upper left corner, and diagonal to the lower left corner, may be shown within legend 122.

To share an image with another projected display 48, a user may perform a gesture in a direction 124, 126, 128, or 130 that corresponds to the recipient projected display. For example, in the illustrated embodiment, a user has moved object 54 in the down direction 128 from a first position 134 proximate to a second position 136, as generally indicated by an arrow 138. The gesture in the down direction 128 may identify projected display 48C as the recipient projected display. Camera 30B (FIG. 7) may detect the gesture, and electronic device 10B may transmit image data for image 98 to electronic device 10C to enable display of image 98 on projected display 48C (FIG. 7).

The direction of the gesture may identify the recipient projected display while the shape of the gesture may identify the image sharing command. For example, as shown in FIG. 12, object 54 represents a hand with one finger extended, which may correspond to an image sharing command to move an image from one projected display 48 to another projected display 48. The shape of object 54 may be varied to identify different image sharing commands. For example, an open palm may be used to exchange images between two projected displays. Further, in other embodiments, the speed and/or trajectory of the gesture may be varied to identify different image sharing commands. For example, a gesture performed in a straight line may represent an image sharing command that moves an image while a gesture performed in an arc represents an image sharing command that copies an image.

As described above with respect to FIGS. 3 through 12, gestures and/or GUIs may be employed to share images 50, 52, and 98 between projected displays 48 within a shared workspace 40. Electronic devices 10 within a shared workspace 40 may be connected to one another over a communication link that allows electronic devices 10 to share image data used to project images 50, 52, and 98 on projected displays 48 within shared workspace 40. One or more of the electronic devices 10 within shared workspace 40 may include an application for interpreting and executing the image sharing commands received as gestures and/or through the GUIs. According to certain embodiments, the application may be encoded on storage 24 of electronic devices 10 and may allow electronic devices 10 to perform one or methods for performing image sharing as described below with respect to FIGS. 13 through 15. Further, in certain embodiments, the application may facilitation programming and/or customization of gestures for image sharing commands.

Figure 13:
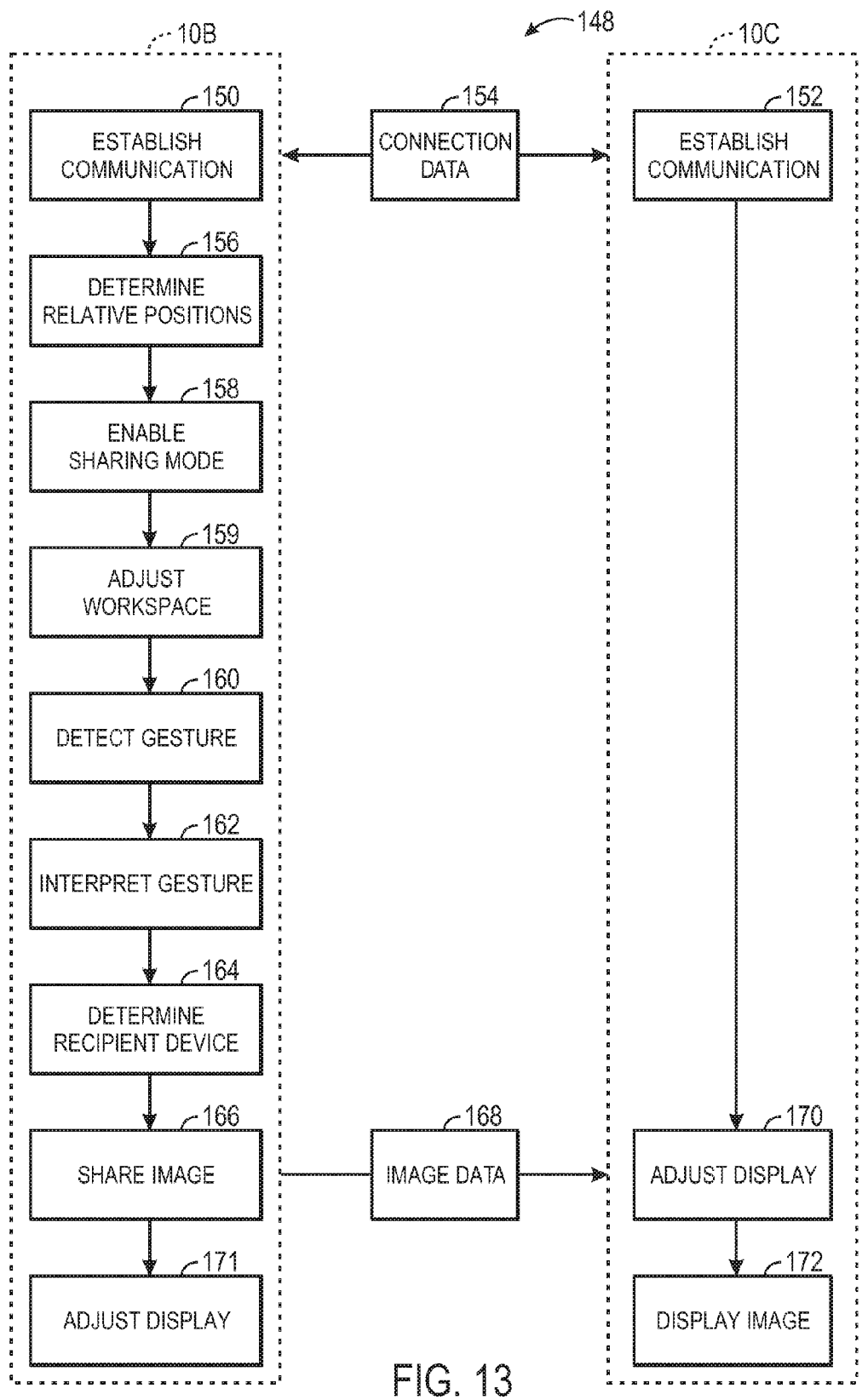
FIG. 13 is a schematic view of methods for sharing images within a shared workspace, in accordance with aspects of the present disclosure.

FIG. 13 depicts a method 148 for sharing images between electronic devices 10 to produce a shared workspace 40 (FIG. 7). Method 148 may begin by establishing (blocks 150 and 152) a communication link between two or more electronic devices, such as electronic devices 10B and 10C, that form shared workspace 40. According to certain embodiments, a communication link between electronic devices 10B and 10C may be established by joining a common network, such as a LAN, PAN, or WAN. For example, each device 10B and 10C may connect to a common network through its communication interface 28 (FIG. 1).

Further, in certain embodiments, close range communication may be used to establish a communication link between electronic devices 10B and 10C. For example, communication interface 28 of each electronic device 10B and 10C may include a close range communication interface, such as a near field communication interface or a Bluetooth® communication interface. Electronic devices 10B and 10C may connect to one another over the close range communication interface and may then either transfer image data over the close range communication link or may exchange connection data 154, such as an SSID, channel identifier, and an encryption key, over the close range communication link to establish a longer range communication link, such as a network connection.

Connection data 154 also may include other information used to establish a communication link between electronic devices 10B and 10C. For example, in certain embodiments, connection data 154 may include identification information broadcast using Internet protocol (IP) or another device identification protocol, such as Bonjour®. Electronic devices 10B and 10C may use the connection data 154 to establish a network connection, such as a PAN, LAN, or WAN connection between electronic devices 10B and 10C.

Connection data 154 further may include location information for electronic devices 10B and 10C. For example, electronic devices 10B and 10C may determine their locations through positioning devices 34 included within electronic devices 10B and 10C. In another example, electronic devices 10B and 10C may determine their locations using position identifiers 74 viewed through cameras 30B and 30C, as shown in FIG. 7. Electronic devices 10B and 10C may exchange location information and use the location information to determine (block 156) their relative positions, which may facilitate interpretation of image sharing commands.

Once a communication link has been established, electronic device 10B may enable (block 158) an image sharing mode. According to certain embodiments, electronic device 10B may enable an image sharing mode in response to establishment of a communication link. In other embodiments, electronic device 10B may enable an image sharing mode in response to receiving a user input. For example, a user may toggle one of the user input devices 26 (FIG. 1) included within electronic device 10B to enable an image sharing mode. In another example, a user may select a graphical element through touchscreen 14B (FIG. 1) of electronic device 10B to initiate an image sharing mode.

In certain embodiments, a user also may select the type of image sharing mode. For example, a user may select a discrete image sharing mode where images may be transferred or copied between projected displays 48, as described above with respect to FIGS. 4 and 5, or a user may select a unified display mode where multiple projected displays 48 may be employed to display individual images on a unified display, as described above with respect to FIG. 6. In another example, a user may turn on a version control feature that allows version information for the shared images to be maintained. Further, in certain embodiments, a user may enable display of a file retrieval feature, such as a table of contents, on display 12 and/or on a projected display, that facilitates user selection of images to be shared.

In another embodiment, electronic device 10B may detect an enablement gesture through camera 30B (FIG. 1). For example, one or more stored gestures 32 (FIG. 1) may correspond to an enablement gesture for enabling the image sharing mode. A user may perform one of these enablement gestures in front of projected display 48B, and the enablement gesture may be detected by camera 30B. Processor 22 (FIG. 1) may then interpret the detected gesture, for example, by comparing the detected gesture to a library of gestures 32 (FIG. 1). After determining that the gesture corresponds to an enablement gesture, processor 22 may enable (block 158) the image sharing mode.

Once the image sharing mode is enabled, electronic device 10B may adjust (block 159) the shared workspace 40. For example, electronic device 10B may determine whether a unified display mode or a discrete image sharing mode has been enabled. If a unified display mode has been enabled, electronic device 10B may adjust the projected displays 48 of shared workspace 40 to form a unified display. For example, electronic device 10B may communicate with the other electronic devices 10 included within the shared workspace to move each of projected displays 48 towards one another to reduce spaces between projected displays 48, as shown in FIG. 6. Further, in certain embodiments, electronic device 10B may communicate with the other electronic devices 10 to minimize overlap of projected displays 48. The overlap adjustment may be performed for both a unified display mode and for a discrete image sharing mode. In certain embodiments, electronic device 10B may determine that no adjustment should be performed.

Electronic device 10B may then detect (block 160) user gestures that correspond to image sharing commands. For example, camera 30B (FIG. 6) within electronic device 10B may detect shadows and/or silhouettes created by a user on projected display 48B (FIG. 7). In another example, camera 30B may detect the object itself that performs the gesture. Camera 30B may detect the shape, magnitude, speed, acceleration, and/or direction of the gestures shown on projected display 48B. According to certain embodiments, camera 30B may detect the gestures using instructions encoded within storage 24 (FIG. 1).

Processor 22 may then interpret (block 162) the gestures detected by camera 30B. For example, processor 22 may use gesture interpretation software included within storage 24 to associate the detected gesture with an image sharing command. According to certain embodiments, processor 22 may compare the detected gestures to a library of gestures 32 stored within storage 24. Further, processor 22 may use lookup tables, algorithms, or the like to determine the image sharing command associated with each detected gesture. Processor 22 also may interpret (block 162) the gestures to identify the image that corresponds to the gesture. For example, processor 22 may use gesture data from camera 30B to identify the image that is located behind the shadow of the gesture produced on projected display 48B. The identified image may be the image that is shared with another projected display 48 during execution of the image sharing command.

After interpreting (block 162) the gesture, electronic device 10B may determine (block 164) the recipient electronic device 10 that may receive the shared image. When only two electronic devices 10B and 10C are included within shared workspace 40, processor 22 may determine which electronic device 10B detected the gesture and select the other electronic device 10C as the recipient electronic device 10. Further, processor 22 may use the magnitude, speed, acceleration, and/or direction of the detected gesture to determine the recipient electronic device 10.

When three or more electronic devices 10 are included within shared workspace 40, processor 22 may determine the recipient electronic device 10 based on the shape, magnitude, speed, acceleration, and/or direction of the detected gesture and the relative positions of electronic devices 10. For example, as shown and described above with respect to FIG. 7, processor 22 may utilize the magnitude of the gesture to determine the recipient electronic device 10. As shown in FIG. 7, the magnitude of the gesture may indicate the relative distance that the recipient electronic device 10 is located from the initiating electronic device 10B. For example, a longer gesture may identify a recipient electronic device 10 that is farther away from the initiating electronic device 10B, while a shorter gesture may identify a recipient electronic device 10 that is closer to the initiating electronic device 10B.

In another example, the direction of the gesture may indicate the side of the initiating electronic device 10B on which the recipient electronic device 10 is located. For example, a gesture to the right may indicate that the recipient electronic device 10 is located to the right of the initiating electronic device 10B, while a gesture to the left may indicate that the recipient electronic device 10 is located to the left of the initiating electronic device 10B.

After determining (block 164) the recipient electronic device 10C, electronic device 10B may then share (block 166) the image with the recipient electronic device 10C. For example, electronic device 10B may transfer image data 168 to recipient electronic device 10C. Image data 168 may include data, such as an image file, that allows recipient electronic device 10C to display the shared image. Further, in certain embodiments, image data 168 may include an image identifier and/or an image source identifier that allows recipient electronic device 10C to retrieve the image from a server and/or a database over a network connection.

In response to receiving image data 168, recipient electronic device 10C may adjust (block 170) its projected display 48C (FIG. 7). For example, electronic device 10C may adjust the relative sizes and/or positions of the images shown on projected display 48C to allow the shared image to be displayed along with the currently displayed images.

Electronic device 10B also may adjust (block 171) its projected display 48B (FIG. 7). For example, if the image sharing command specifies that an image should be transferred from projected display 48B to projected display 48C, electronic device 10B may remove the image from its projected display 48B. In another example, if the image sharing command specifies that images should be exchanged between projected displays 48B and 48C, electronic device 10B may display an image received from electronic device 10C on it projected display 48B. For certain image sharing commands, a display adjustment may not be performed by the initiating electronic device 10B. For example, if the image sharing command specifies that an image should be copied to projected display 48C, electronic device 10B may continue to display the image without adjusting its projected display 48B. In another example, if the image sharing command specifies that two projected displays 48B and 48C should be used to show an image on a unified space, electronic device 10B may adjust its projected display 48B to show only a portion of the image.

Recipient electronic device 10C may then display (block 172) the image. For example, recipient electronic device 10C may use projector 16C to display the image on projected display 48C. Further, when a unified display mode is enabled, recipient electronic device 10C may display a portion of the image on projected display 48C while the remainder of the image is displayed on projected display 48B, as shown in FIG. 6. In certain embodiments the adjustments (blocks 170 and 171) to the projected displays 48C and 48B may be performed simultaneously with or just prior to display (block 172) of the image.

Figure 14:
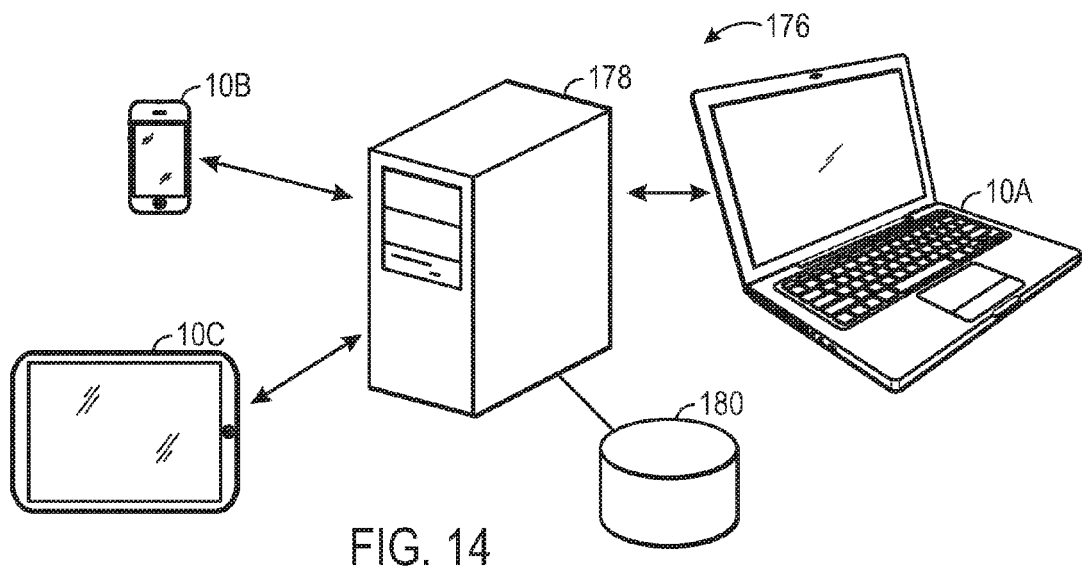
FIG. 14 is a schematic view of another embodiment of a shared workspace system, in accordance with aspects of the present disclosure.

FIG. 14 depicts another embodiment of a system 176 for sharing images. Rather than being connected directly to one another, electronic devices 10A, 10B, and 10C may be connected to each other through a server 178. Server 178 may be connected to a database 180 that contains images that may be displayed on shared workspace 40 (FIG. 7). Electronic devices 10A, 10B, and 10C may be connected to server 178 through communication interfaces 28 (FIG. 1) included within each electronic device 10A, 10B, and 10C. The connection may include a close range communication link and/or a long range communication link, such as a LAN communication link. Further, in certain embodiments, electronic devices 10A, 10B, and 10C may be connected to server 178 over the Internet. Server 178 may maintain the shared database 180 of images and/or files that may be shared within shared workspace 40. For example, as changes are made to images within shared workspace 40, server 178 may store updated versions of the images and/or files. Further, in certain embodiments, server 178 may maintain version control information for the images and/or files included within database 180.

Figure 15:
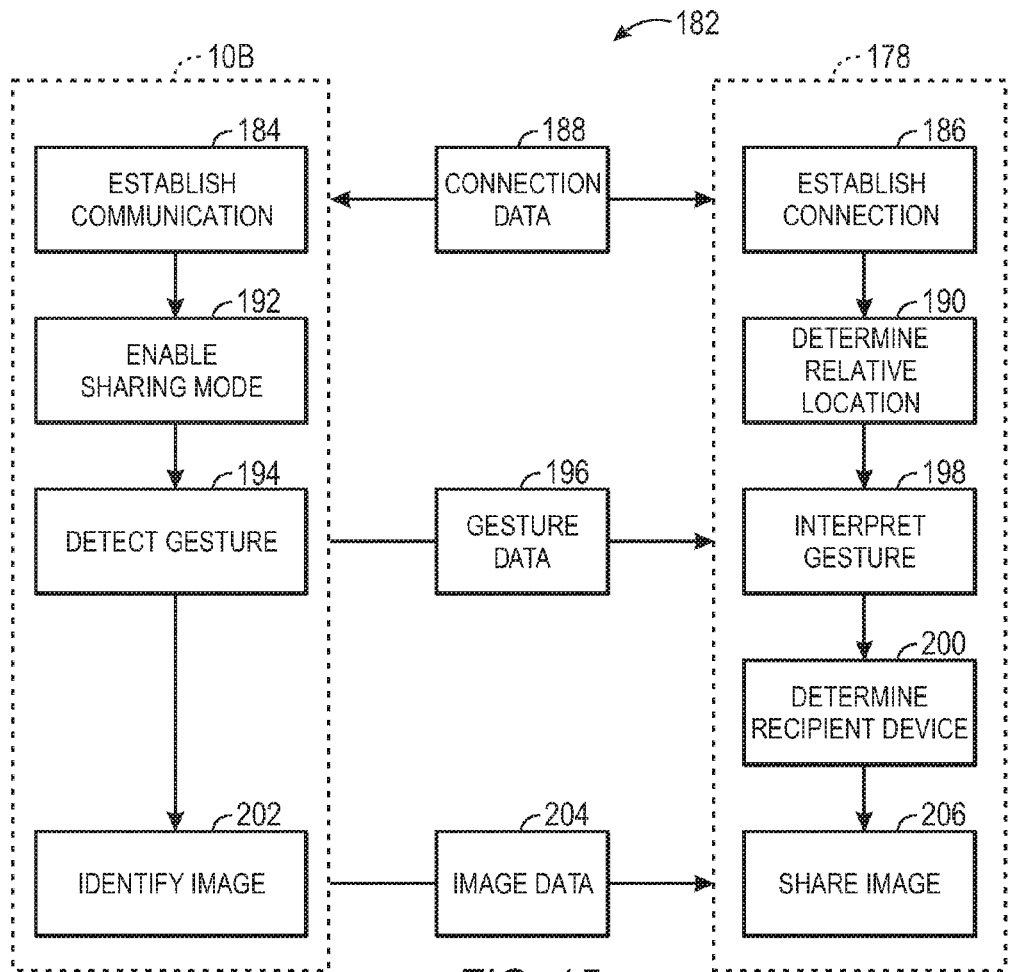
FIG. 15 is a schematic view of methods for sharing images within a shared workspace, in accordance with aspects of the present disclosure.

FIG. 15 depicts a method 182 that may be employed to share images between electronic devices 10 connected through server 178, as shown in FIG. 14. Method 182 may begin by establishing (blocks 184 and 186) a connection between an electronic device, such as electronic device 10B, and server 178. As may be appreciated, although only one electronic device 10B is shown as connected to server 178, in other embodiments, any number of electronic devices 10 may be connect to server 178 to perform method 182.

Connection data 188 may be exchanged between electronic device 10B and server 178 to establish the connection. For example, device identifier information and/or protocol information may be exchanged to connect electronic device 10B to server 178 through a network connection, such as a WAN, LAN, or PAN connection, among others. Connection data 188 also may include location information for electronic device 10B. For example, electronic device 10B may obtain location information through positioning device 34 included within electronic device 10B. In another example, electronic device 10B may obtain location information by viewing position identifiers 74 through camera 30B, as described above with respect to FIG. 6. Electronic device 10B may include the location information in the connection data 188 provided to server 178. Server 178 may then use the location information to determine (block 190) relative locations of the connected electronic devices 10. For example, server 178 may compare the locations of each electronic device 10 connected to server 178 to determine the relative positions of the electronic devices 10.

After establishing (block 184) a connection to server 178, electronic device 10B may enable (block 192) an image sharing mode. For example, electronic device 10B may receive a user input that enables the image sharing mode, such as selection of a graphical element through a GUI of electronic device 10B. In another example, electronic device 10B may detect a gesture on projected display 48B (FIG. 7) that is assigned to enable the image sharing mode.

Once the image sharing mode is enabled, electronic device 10B may detect (block 194) user gestures that correspond to image sharing commands. For example, electronic device 10B may detect a gesture on projected display 48B through camera 30B and may capture the detected gesture as gesture data 196. Electronic device 10B may then transmit gesture data 196 to server 178 to interpret (block 198) the gesture. According to certain embodiments, database 180 (FIG. 14) may include a library of gestures. Server 178 may compare gesture data 196 to the library of gestures to determine the image sharing command corresponding to the detected gesture. Further, server 178 may employ algorithms, lookup tables, or the like, to determine the image sharing command that corresponds to the detected gesture.

Gesture data 196 also may be employed by server 178 to determine (block 200) the recipient electronic device. According to certain embodiments, gesture data 196 may include the magnitude and/or direction of the gesture, which server 178 may use, in conjunction with the relative positions of electronic devices 10, to determine the recipient device. For example, server 178 may interpret a larger magnitude gesture to identify a recipient electronic device that is farther away from the initiating electronic device 10B, while a smaller magnitude gesture may identify a recipient electronic device that is closer to the initiating electronic device 10B. Further, server 178 may use the direction of a gesture to determine the side of the initiating electronic device 10B on which the recipient electronic device 10 is located.

To execute the image sharing command, electronic device 10B may identify (block 202) the image to be shared with the recipient electronic device 10. For example, processor 22 (FIG. 1) of electronic device 10B may interpret the detected gesture to determine the image on projected display 48B to which the gesture corresponds. According to certain embodiments, processor 22 may use gesture data 196 to determine the image that is behind the shadow created by the gesture on projected display 48B. Further, in certain embodiments, processor 22 may use gesture data 196 to select a file through a file retrieval feature, such as a table of contents, shown on projected display 48B. In certain embodiments, the file retrieval feature may be employed to retrieve files directly from database 180 for display on shared workspace 40 (FIG. 7) and/or to transfer files from shared workspace 40 to database 180.

Electronic device 10B may then retrieve image data 204 for the identified image and may transmit image data 204 to server 178. According to certain embodiments, image data 204 may include an image identifier that allows server 178 to retrieve the identified image from database 180. Further, in certain embodiments, if the image is not stored within database 180, image data 204 may include data, such as the image source file, for reproducing the identified image.

After receive image data 204, server 178 may then share (block 206) the image with the recipient electronic device. For example, according to certain embodiments, server 178 may retrieve the image source file from database 180 (FIG. 14) and transmit the image source file to the recipient electronic device. The recipient electronic device may use the image source file to display the image on its projected display 48. In other embodiments, server 178 may transmit an image identifier that identifies the location of the identified image within database 180 to the recipient electronic device. The recipient electronic device may then use the image identifier to retrieve and display the identified image on its projected display. Further, in certain embodiments, server 178 may store the image within database 180 for future use. For example, in certain embodiments, a user may modify an image shown on projected display 48B. The user may then perform a gesture that transfers the image to server 178 for storage within database 180.

As may be appreciated, although the methods 148 and 182 described herein are depicted in the context to two electronic devices 10, the methods may be performed with any number of electronic devices 10 connected to produce a shared workspace 40. Further, electronic device 10 and/or server 178 may perform steps within the methods simultaneously or in succession with each other and/or with the other method steps. Moreover, the GUIs described herein that may be used to perform the methods are provided by way of example only, and are not intended to be limiting. In other embodiments, the layouts of the interfaces, the relative shapes and sizes and types of graphical elements and the types of input devices 26 may vary.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
a projector configured to produce a first projected display that is projected onto a projection surface, wherein the first projected display shows an image;
one or more cameras configured to capture a user gesture made in front of the projection surface, a shadow of the user gesture on the projection surface, or both, made with respect to the first projected display, wherein the user gesture is associated with sharing the image;
a communication interface configured to enable communication with a second electronic device configured to produce a second projected display; and
a processor operably coupled to the communication interface, the projector, and the one or more cameras, and configured to identify the image shown on the first projected display based on the user gesture, the shadow of the user gesture, or both, and to transmit data associated with the image to the second electronic device through the communication interface to form a shared workspace comprising the first projected display and the second projected display.

2. The electronic device of claim 1, wherein the processor is configured to interpret the user gesture, the shadow of the user gesture, or both to identify the second electronic device.

3. The electronic device of claim 1, wherein the processor is configured to interpret the user gesture, the shadow of the user gesture, or both to identify the image.

4. The electronic device of claim 1, wherein the data comprises a source file for the image or a source file location identifier for the image.

5. The electronic device of claim 1, wherein the data comprises version control information for the image.

6. The electronic device of claim 1, wherein the processor is configured to compare the user gesture, the shadow of the user gesture, or both to a library of user gestures to determine an image sharing command associated with the user gesture, the shadow of the user gesture, or both, and wherein transmitting the data comprises executing the image sharing command.

7. The electronic device of claim 1, wherein the data enables the second electronic device to display the image on the second projected display.

8. The electronic device of claim 1, wherein the shared workspace comprises the first projected display and the second projected display projected onto the projection surface as a unified space.

9. The electronic device of claim 1, wherein the user gesture, the shadow of the user gesture, or both, comprises an image sharing command.

10. The electronic device of claim 1, wherein the shadow of the user gesture comprises a shadow cast in the first projected display on the projected surface.

11. The electronic device of claim 1, wherein the user gesture, the shadow of the user gesture, or both, comprises a movement made across the first projected display.

12. A method executed by a processor of a first electronic device, comprising:
producing a first projected display that is projected onto a projection surface using the first electronic device;
establishing a communication link with a second electronic device that produces a second projected display that is also projected onto the projection surface;
detecting a user gesture made in front of the projection surface, a shadow of the user gesture on the first projected display on the projection surface, or both, made with respect to the first projected display through a camera of the first electronic device that is aimed at the projection surface; and communicating image data between the first electronic device and the second electronic device based on the user gesture, the shadow of the user gesture, or both to form a shared workspace comprising the first projected display and the second projected display.

13. The method of claim 12, comprising displaying an image represented by the image data on the first projected display and on the second projected display.

14. The method of claim 12, comprising interpreting the user gesture, the shadow of the user gesture, or both to determine an image sharing command associated with the gesture, wherein communicating the image data executes the image sharing command.

15. The method of claim 12, comprising interpreting the user gesture, the shadow of the user gesture, or both to determine an identity of the second electronic device.

16. The method of claim 15, wherein the user gesture, the shadow of the user gesture, or both is interpreted based on a magnitude and/or a direction of the user gesture, the shadow of the user gesture, or both.

17. The method of claim 12, comprising detecting an image sharing enablement user gesture, a shadow of the image sharing enablement user gesture, or both, through the camera and enabling an imaging sharing mode between the first electronic device and the second electronic device based on the enablement user gesture, the shadow of the image sharing enablement user gesture, or both.

18. The method of claim 12, comprising receiving position information for the second electronic device and determining relative positions of the first electronic device and the second electronic device based on the position information.

19. The method of claim 12, comprising identifying the image data based on the user gesture, the shadow of the user gesture, or both made with respect to the first projected display when the user gesture, the shadow of the user gesture, or both are made with respect to an image shown on the first projected display.

20. A first electronic device, comprising:
a projector configured to produce a first projected display that is projected onto a projection surface;
a camera pointed at the projection surface and configured to capture a user gesture made in front of the projection surface, a shadow of the user gesture in the first projected display on the projection surface, or both, made with respect to the first projected display;
a communication interface configured to enable communication with one or more other electronic devices, each configured to produce another projected display onto the projection surface; and
a processor operably coupled to the communication interface, the projector, and the camera, and configured to identify an image shown on the first projected display based on the user gesture, the shadow of the user gesture, or both, to determine a recipient electronic device of the one or more other electronic devices based on the user gesture, the shadow of the user gesture, or both, and to transmit data associated with the image to the recipient electronic device through the communication interface to enable the recipient electronic device to display the image on a respective other projected display generated by the recipient electronic device.

21. The first electronic device of claim 20, wherein the camera comprises a viewing area wider than a display angle of the projector.

22. The first electronic device of claim 20, wherein the camera is configured to detect an electronic device identifier shown on a neighboring projected display of at least one of the another projected displays, and wherein the processor is configured to determine positions of the one or more other electronic devices with respect to the first electronic device based at least in part on the electronic device identifier.

23. The first electronic device of claim 20, comprising a positioning device configured to determine a location of the first electronic device, wherein the processor is configured to determine the recipient electronic device based at least in part on the location.

24. The first electronic device of claim 20, wherein the camera is configured to detect a magnitude and/or a direction of the user gesture, the shadow of the user gesture, or both, and wherein the processor is configured to determine the recipient electronic device based on the magnitude and/or the direction.

25. The first electronic device of claim 20, comprising a user interface configured to enable user selection of positions of the one or more other electronic devices with respect to the electronic device, wherein the processor is configured to determine the recipient device based on the relative positions.

26. A manufacture, comprising:
one or more tangible, non-transitory computer-readable storage media having application instructions encoded thereon for execution by a processor, the application instructions comprising instructions to:
interpret a user gesture, a shadow of the user gesture, or both, made with respect to a first projected display that is projected on a projection surface to determine an image sharing command;
determine a recipient electronic device projecting a second projected display on the projection surface based at least in part on the user gesture, the shadow of the user gesture, or both; and
transmit image data to the recipient electronic device to execute the image sharing command, wherein the first projected display and the second projected display thereby form a shared workspace.

27. The manufacture of claim 26, wherein the application instructions include instructions for determining a position of the recipient electronic device.

28. The manufacture of claim 26, wherein the application instructions include instructions for identifying image data based on the user gesture, the shadow of the user gesture, or both.

29. The manufacture of claim 26, wherein the application instructions include instructions for enabling an image sharing mode based on interpretation of an additional user gesture, a shadow of the additional user gesture, or both.

30. A first electronic device, comprising:
one or more cameras aimed at a projection surface and configured to detect an image sharing command gesture made in front of the projection surface, a shadow of the image sharing command gesture, or both, made with respect to a first projected display, wherein the first projected display is projected on the projection surface;
a communication interface configured to enable communication with a second electronic device configured to produce a second projected display that is also projected on the projection surface or an adjacent projection surface; and
a processor operably coupled to the communication interface and the one or more cameras, and configured to identify an image shown on the first projected display based at least in part on the image sharing command gesture, the shadow of the image sharing command gesture, or both, and to transmit data associated with the image to the second electronic device through the communication interface to enable the second electronic device to display the image on the second projected display.

31. The first electronic device of claim 30, wherein the image sharing command gesture, the shadow of the image sharing command gesture, or both, comprise a movement made across the first projected display.

32. The first electronic device of claim 30, wherein the processor is configured to interpret the image sharing command gesture, the shadow of the image sharing command gesture, or both, to determine an identity of the second electronic device.

33. The first electronic device of claim 30, wherein the communication interface comprises a near field communication interface configured to receive information identifying the second electronic device.

34. A first electronic device, comprising:
- an input/output port configured to enable connection of the first electronic device to a projector configured to produce a first projected display that is projected onto a projection surface;
- a communication interface configured to enable communication with a second electronic device configured to produce a second projected display, wherein the second projected display is also projected onto the projection surface and forms a shared workspace with the first projected display; and
- a processor operably coupled to the communication interface, and configured to receive image data from the second electronic device, wherein the image data is identified based on an image sharing command gesture performed in front of on the second projected display, a shadow of the image sharing command on the projection surface, or both, and configured to enable display of an image represented by the image data on the first projected display.

35. The first electronic device of claim 34, wherein the processor is configured to adjust a size of another image shown on the first projected display to enable display of the image represented by the image data.

36. The first electronic device of claim 34, wherein the processor is configured to adjust a position of another image shown on the first projected display to enable display of the image represented by the image data.

37. The first electronic device of claim 34, comprising one or more cameras pointed toward the projection surface and configured to detect an image sharing command gesture performed in front of the first projected display, a shadow of the image sharing command gesture performed in front of the first projected display, or both.

* * * * *